(12) United States Patent
Kim

(10) Patent No.: US 8,655,331 B2
(45) Date of Patent: Feb. 18, 2014

(54) INFORMATION UPDATE IN A MOBILE COMMUNICATION TERMINAL

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 427 days.

(21) Appl. No.: 12/709,356

(22) Filed: Feb. 19, 2010

(65) Prior Publication Data

US 2010/0216442 A1    Aug. 26, 2010

(30) Foreign Application Priority Data

Feb. 20, 2009  (KR) .......................... 10-2009-0014341
Jun. 23, 2009  (KR) .......................... 10-2009-0055811

(51) Int. Cl.
*H04M 3/42* (2006.01)

(52) U.S. Cl.
USPC .............. 455/415; 455/414.1; 455/412.1; 455/412.2; 455/466; 455/551

(58) Field of Classification Search
USPC ....................................................... 455/414.1
See application file for complete search history.

(56) References Cited

U.S. PATENT DOCUMENTS

| | | | | |
|---|---|---|---|---|
| 5,907,604 | A * | 5/1999 | Hsu | ............ 379/142.06 |
| 7,945,504 | B1 * | 5/2011 | Lloyd et al. | ............ 705/37 |
| 2003/0091173 | A1 | 5/2003 | DeSalvo | |
| 2005/0113076 | A1 | 5/2005 | Lee | |
| 2007/0123234 | A1 * | 5/2007 | Kim | ............ 455/414.1 |
| 2007/0189478 | A1 * | 8/2007 | Lemke | ............ 379/142.01 |
| 2009/0043844 | A1 * | 2/2009 | Zimmet et al. | ............ 709/204 |
| 2010/0167710 | A1 * | 7/2010 | Alhainen | ............ 455/416 |

FOREIGN PATENT DOCUMENTS

| | | |
|---|---|---|
| CN | 1960539 | 5/2007 |
| CN | 101040244 | 9/2007 |

OTHER PUBLICATIONS

The State Intellectual Property Office of the People's Republic of China Application Serial No. 201010117301.4, Office Action dated Apr. 17, 2013, 10 pages.
In the European Patent Office Application No. 10001156.8, Search Report dated Nov. 21, 2012, 6 pages.

* cited by examiner

*Primary Examiner* — Suhail Khan
(74) *Attorney, Agent, or Firm* — Lee, Hong, Degerman, Kang & Waimey

(57) ABSTRACT

A method of updating contact information stored in one or more phone book entries stored in a mobile communication terminal comprises receiving caller id information; comparing the received caller id information with contact information stored in the one or more phone book entries; and displaying the contact information in one of said phone book entries, if the contact information at least partially matches the caller id information.

20 Claims, 24 Drawing Sheets

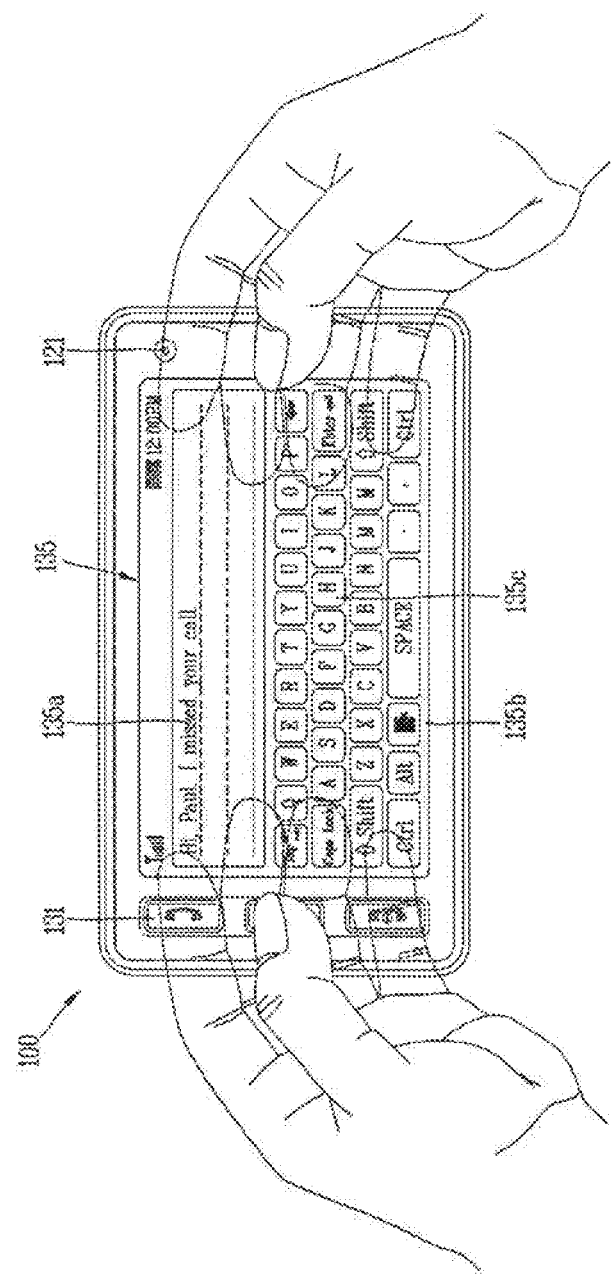

FIG. 9

| Caller phone number | Correspondent party phone number |
|---|---|
| (010)-(1234)-(5678)<br>1st group / 3rd group<br>2nd group | 019 − 4156 − 5678<br>017 − 4156 − 5670<br>011 − 4156 − 0567 |

(9-1)

| Caller phone number | Correspondent party phone number |
|---|---|
| (010)-(1234)-(5678)<br>1st group / 3rd group<br>2nd group | 019 − 1234 − 0125<br>017 − 1230 − 0125<br>011 − 2123 − 0125 |

(9-2)

| Caller phone number | Correspondent party phone number |
|---|---|
| (010)-(1234)-(5678)<br>1st group / 3rd group<br>2nd group | 019 − 4156 − 1234<br>017 − 4156 − 1230<br>011 − 4156 − 0123 |

(9-3)

| Caller phone number | Correspondent party phone number |
|---|---|
| (010)-(1234)-(5678)<br>1st group / 3rd group<br>2nd group | 019 − 5678 − 0125<br>017 − 5670 − 0125<br>011 − 2567 − 0125 |

(9-4)

INFORMATION UPDATE IN A MOBILE COMMUNICATION TERMINAL

CROSS-REFERENCE TO RELATED APPLICATIONS

Pursuant to 35 U.S.C. §119(a), this application claims the benefit of earlier filing date and right of priority to Korean Application Nos. 10-2009-0014341, filed on Feb. 20, 2009, and 10-2009-0055811, filed on Jun. 23, 2009, the contents of which are hereby incorporated by reference herein in their entirety.

RELATED FIELD

The claimed subject matter relates to a mobile terminal and to a method of updating information stored in a mobile communication terminal.

BACKGROUND

A mobile communication terminal is a device which may be configured to perform various functions. Examples of such functions include communicating data and voice, capturing images and video via a camera, recording audio, playing music files and outputting music via a speaker system, and displaying images and video on a display. Some terminals include additional functionality which supports playing video games. Other terminals may be configured as multimedia players. Some mobile terminals have been configured to receive broadcast and multicast signals which permit viewing of contents, such as videos and television programs.

Generally, terminals may be classified into mobile terminals and stationary terminals. Mobile terminals may be further classified into handheld terminals and vehicle mount terminals depending on portability. There are ongoing efforts to support and increase the functionality of mobile terminals. Such efforts include software and hardware improvements, as well as changes and improvements in the structural components which form the mobile terminal.

A terminal user may have a new phone number assigned to his mobile terminal due to switching to a new mobile communication service provider or for other personal reasons. If the terminal user having changed the phone number of a terminal makes a phone call to a third party, the new phone number is displayed as a caller identification (i.e., caller id information) on the mobile terminal receiving the call. The caller id information may include the phone number and the name of the caller. It is desirable that contact information stored in a respective phone book entry in the receiving terminal to be automatically updated based on the new caller id information of the calling party.

SUMMARY

A mobile communication terminal according to one embodiment comprises a display unit; a user input unit; a wireless communication unit; a memory configured to store one or more phone book entries, wherein an entry includes contact information of a third party; and a control unit configured to compare caller id information associated with a received call with the contact information in the one or more phone book entries and to cause the contact information for at least one entry in the phone book to be displayed on the display unit, in response to determining that the caller id information at least partially matches the contact information for said entry. The contact information for said entry is displayed, in response to user interaction with the user input unit.

User interaction with a first icon displayed on the display causes the contact information to be stored in the memory, wherein the first icon is displayed in response to determining that at least a partial match is not found for the caller id information in the phone book. The caller id information comprises at least one of a number, an image, a video, or a message, wherein the message comprises at least one of an e-mail message, an audio message, a SMS message, a MMS message or an instant message. A partial match is determined by detecting a match in at least one of an object of an image or a video, an audio feature of a video or an audio message, or a portion of a phone number and a portion of a text. The matching portion of the caller id information is conspicuously displayed.

In one embodiment, the first icon disappears after the user interaction with the first icon is completed. After the first icon has disappeared, a second icon is displayed, wherein user interaction with the second icon allows the user to choose to reject a phone call, accept a phone call or change edit information stored in a phone book entry. The first icon is displayed before a phone call is received, during a phone conversation, or after the phone call is terminated. If at least two entries in the phone book are similar to the caller id information, a phone book entry selected by a user is updated based on the caller id information. Optionally, a portion of the phone book entry that matches the caller id information is conspicuously displayed on the display. An indicator is displayed on the display to indicate that more than one phone book entry at least partially matches the caller id information.

In one embodiment, a user is provided with an option to select a portion of the caller id information that is to be matched against contact information in one or more phone book entries. The user is provided with an option to drag and drop the selected portion in a display area, wherein in response to the drag and drop action one or more phone book entries that at least partially match the selected portions are identified. The caller id information is selected from a list displayed on the display unit. The contact information included in a selected phone book entry is updated based on the selected caller id information.

In accordance with one aspect, a method of updating contact information stored in one or more phone book entries stored in a mobile communication terminal is provided. The method comprises receiving caller id information; comparing the received caller id information with contact information in stored in the one or more phone book entries; and displaying the contact information in one of said phone book entries, if the contact information at least partially matches the caller id information. Contact information in a matching phone book entry is updated based on the caller id information, in response to user interaction with the mobile communication terminal. Contact information in a matching phone book entry is updated based on the caller id information, in response to a user selecting the phone book entry from a displayed list that includes one or more phone book entries. The method may further comprise updating contact information in a phone book entry, in response to determining that contact information at least partially matches caller id information received when a call is received by the mobile communication terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3A and FIG. 3B are front diagrams of a mobile terminal according to one embodiment of the present invention for explaining one operational status of the mobile terminal, respectively;

FIG. 9 is an exemplary diagram for a correspondent party phone number similar to a caller phone number in a method of controlling a mobile terminal according to an embodiment of the present invention;

DETAILED DESCRIPTION OF EXAMPLE EMBODIMENTS

Reference will now be made in detail to the preferred embodiments, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

In the following, the term "caller information" may refer to information received from a third party attempting to call a mobile terminal or attempting to leave a message of some sort. The term "calling information" may refer to information received by the mobile terminal from a user of the mobile terminal.

As used herein, the suffixes 'module', 'unit' and 'part' are used for elements in order to facilitate the disclosure. Therefore, significant meanings or roles are not given to the suffixes themselves and it is understood that the 'module', 'unit' and 'part' may be used together or interchangeably.

The ideas disclosed here may be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators. By way of non-limiting example, further description will be with regard to a mobile terminal 100, and it should be noted that such teachings may apply equally to other types of terminals.

Figure 1:
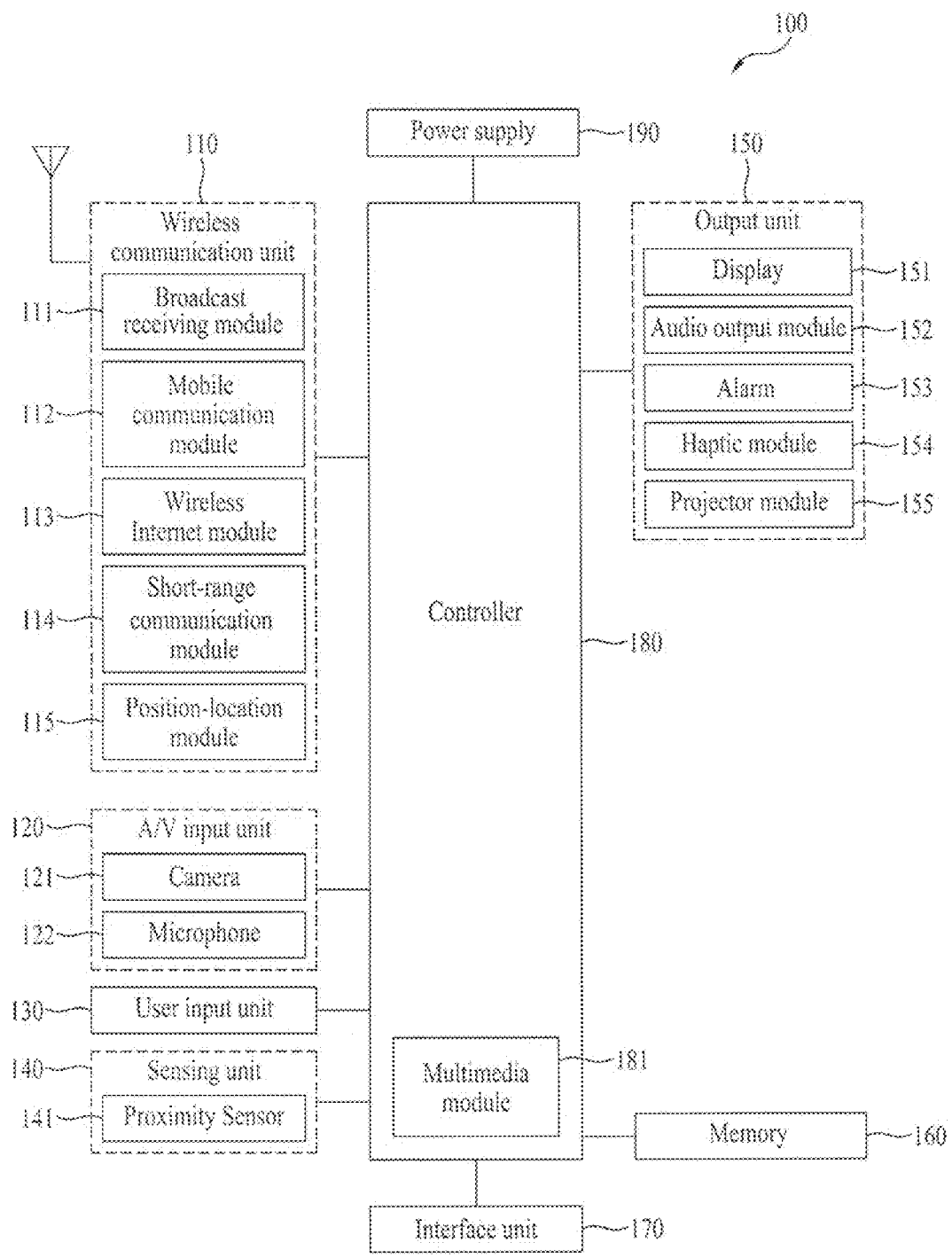
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence. First of all, the wireless communication unit 110 typically includes one or more components which permits wireless communication between the mobile terminal 100 and a wireless communication system or network within which the mobile terminal 100 is located. For instance, the wireless communication unit 110 may include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 may be provided to the mobile terminal 100 in pursuit of simultaneous receptions of at least two broadcast channels or broadcast channel switching facilitation. The broadcast associated information includes information associated with a broadcast channel, a broadcast program, a broadcast service provider, etc. And, the broadcast associated information may be provided via a mobile communication network. In this case, the broadcast associated information may be received by the mobile communication module 112.

The broadcast associated information may be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link (MediaFLO®) and integrated services digital broadcast-terrestrial (ISDB-T). Optionally, the broadcast receiving module 111 may be configured suitable for other broadcasting systems as well as the above-explained digital broadcasting systems.

The broadcast signal and/or broadcast associated information received by the broadcast receiving module 111 may be stored in a suitable device, such as a memory 160. The mobile communication module 112 transmits/receives wireless signals to/from one or more network entities (e.g., base station, external terminal, server, etc.). Such wireless signals may represent audio, video, and data according to text/multimedia message transceivings, among others.

The mobile communication module 112 is able to directly access the mobile communication network. Alternatively, the mobile communication module 112 may indirectly access the mobile communication network via WPBX (wireless private branch exchange). The wireless Internet module 113 supports Internet access for the mobile terminal 100. This module may be internally or externally coupled to the mobile terminal 100. In this case, the wireless Internet technology may include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies referred to as Bluetooth and ZigBee, to name a few. The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames may be displayed on the display 151.

The image frames processed by the camera 121 may be stored in the memory 160 or may be externally transmitted via the wireless communication unit 110. Optionally, at least two cameras 121 may be provided to the mobile terminal 100 according to environment of usage. The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc. The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 may include a proximity sensor 141. The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI. The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays may be implemented in a transparent or optical transmittive type, which may be named a transparent display. As a representative example for the transparent display, there is TOLED (transparent OLED) or the like. A rear configuration of the display 151 may be implemented in the optical transmittive type as well. In this configuration, a user is able to see an object in rear of a terminal body via the area occupied by the display 151 of the terminal body. At least two displays 151 may be provided to the mobile terminal 100 in accordance with the implemented configuration of the mobile terminal 100. For instance, a plurality of displays may be arranged on a single face of the mobile terminal 100 in a manner of being spaced apart from each other or being built in one body. Alternatively, a plurality of displays may be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor may be configured as a touch film, a touch sheet, a touchpad or the like. The touch sensor may be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched. Referring to FIG. 1, a proximity sensor (not shown in the drawing) may be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) may be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern may be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal may be outputted via the display 151 or the audio output unit 152. Hence, the display 151 or the audio output module 152 may be regarded as a part of the alarm unit 153.

The haptic module 154 generates various tactile effects that may be sensed by a user. Vibration is a representative one of the tactile effects generated by the haptic module 154. Strength and pattern of the vibration generated by the haptic module 154 are controllable. For instance, different vibrations may be outputted in a manner of being synthesized together or may be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 may be implemented to enable a user to sense the tactile effect through a muscle sense of finger, arm or the like as well as to transfer the tactile effect through a direct contact. Optionally, at least two haptic modules 154 may be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 may include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 may further include a device (not shown in the drawing) for adjusting an image projected direction by mechanically moving the lens or the whole module.

The projector module 155 may be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and may be advantageous for the downsizing of the projector module 151.

Preferably, the projector module 155 may be provided in a length direction of a lateral, front or backside direction of the mobile terminal 100. And, it is understood that the projector module 155 may be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) may be stored in the memory unit 160. Moreover, data for various patterns of vibration and/or sound outputted in case of a touch input to the touchscreen may be stored in the memory unit 160.

The memory 160 may be implemented using any type or combination of suitable volatile and non-volatile memory or storage devices including hard disk, random access memory (RAM), static random access memory (SRAM), electrically erasable programmable read-memory (EEPROM), erasable programmable read-memory (EPROM), programmable read-memory (PROM), read-memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and may include User Identify Module (UIM), Subscriber Identify Module (SIM), Universal Subscriber Identity Module (USIM) and/or the like. A device having the identity module (hereinafter called 'identity device') may be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power may operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof. Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes may be implemented with a software application written in any suitable programming language and may be stored in a memory such as the memory 160, and executed by a controller or processor, such as the controller 180.

Figure 2A:
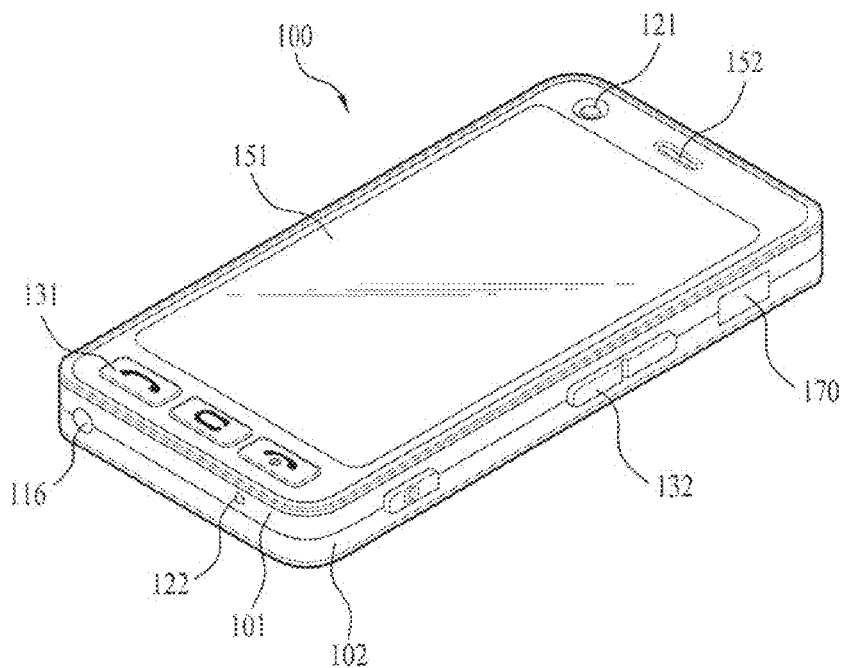
FIG. 2A is a front perspective diagram of a mobile terminal according to one embodiment of the present invention.

FIG. 2A is a front perspective diagram of a mobile terminal according to one embodiment of the present invention. The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case may be divided into a front case 101 and a rear case 102. Various electric/electronic parts are loaded in a space provided between the front and rear cases 101 and 102. Optionally, at least one middle case may be further provided between the front and rear cases 101 and 102 in addition. The cases 101 and 102 are formed by injection molding of synthetic resin or may be formed of metal substance such as stainless steel (STS), titanium (Ti) or the like for example.

A display 151, an audio output unit 152, a camera 121, user input units 130/131 and 132, a microphone 122, an interface 180 and the like may be provided to the terminal body, and more particularly, to the front case 101. The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 may be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 may be named a manipulating portion and may adopt any mechanism of a tactile manner that enables a user to perform a manipulation action by experiencing a tactile feeling.

Content inputted by the first or second manipulating unit 131 or 132 may be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like may be inputted to the second manipulating unit 132.

Figure 2B:
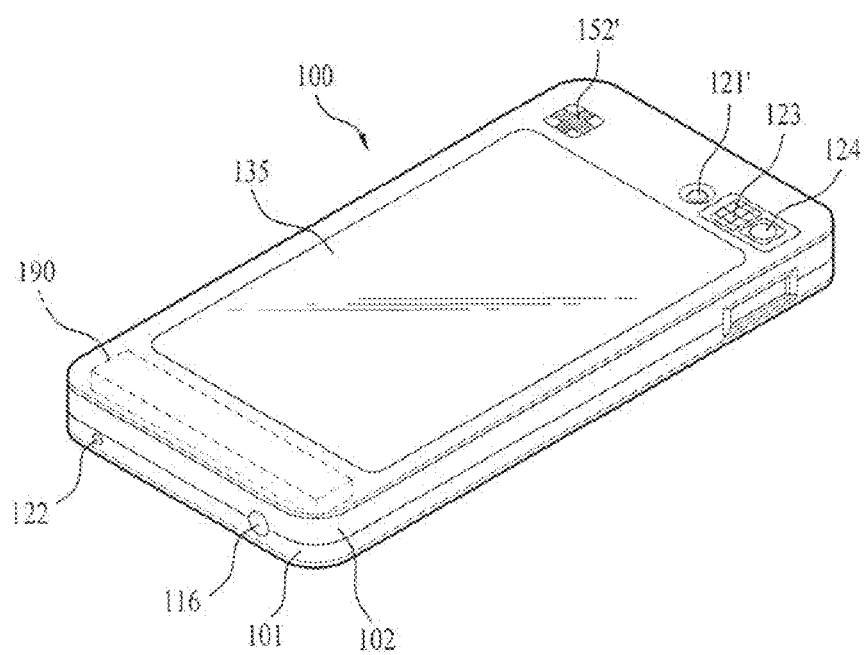
FIG. 2B is a rear perspective diagram of a mobile terminal according to one embodiment of the present invention.

FIG. 2B is a perspective diagram of a backside of the terminal shown in FIG. 2A. Referring to FIG. 2B, a camera 121' may be additionally provided to a backside of the terminal body, and more particularly, to the rear case 102. The camera 121 has a photographing direction that is substantially opposite to that of the former camera 121 shown in FIG. 21A and may have pixels differing from those of the former camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' may be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' may be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 may be additionally provided to the lateral side of the terminal body as well as an antenna for communication or the like. The antenna 124 constructing a portion of the broadcast receiving module 111 shown in FIG. 1 may be retractably provided to the terminal body.

A power supply unit 190 for supplying a power to the terminal 100 is provided to the terminal body. And, the power supply unit 190 may be configured to be built within the terminal body. Alternatively, the power supply unit 190 may be configured to be detachably connected to the terminal body.

A touchpad 135 for detecting a touch may be additionally provided to the rear case 102. The touchpad 135 may be configured in a light transmittive type like the display 151. In this case, if the display 151 is configured to output visual information from its both faces, it is able to recognize the visual information via the touchpad 135 as well. The information outputted from both of the faces may be entirely controlled by the touchpad 135. Alternatively, a display is further provided to the touchpad 135 so that a touchscreen may be provided to the rear case 102 as well.

The touchpad 135 is activated by interconnecting with the display 151 of the front case 101. The touchpad 135 may be provided in rear of the display 151 in parallel. The touchpad 135 may have a size equal to or smaller than that of the display 151.

Interconnected operational mechanism between the display 151 and the touchpad 135 are explained with reference to FIG. 3A and FIG. 3B as follows.

Figure 3A:
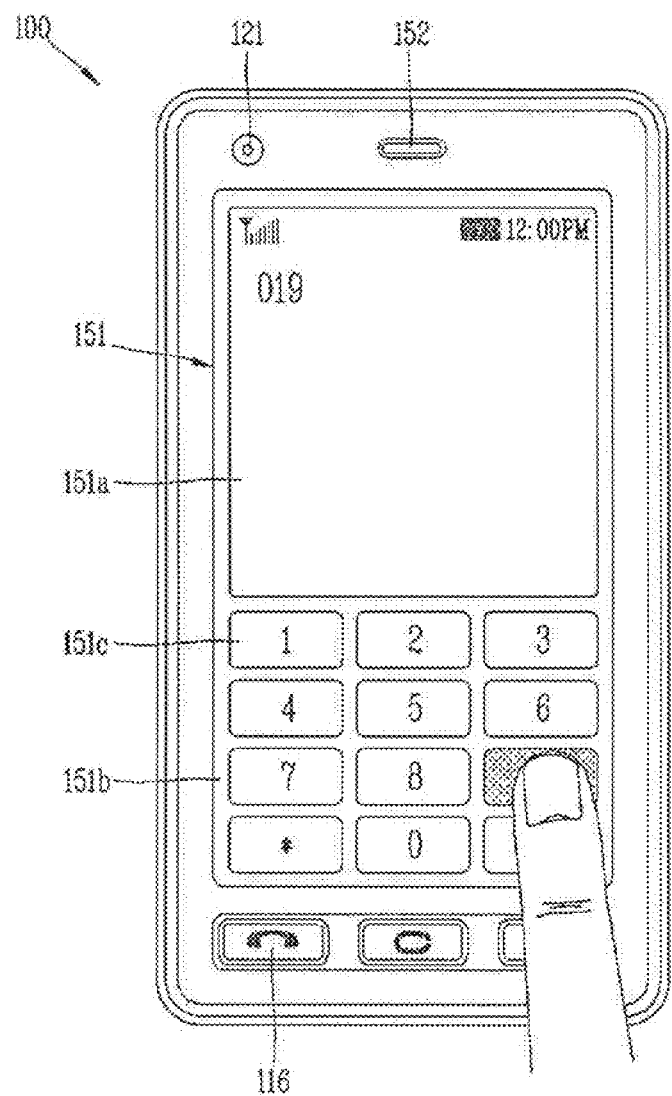

FIG. 3A and FIG. 3B are front-view diagrams of a terminal according to one embodiment of the present invention for explaining an operational state thereof. First of all, various kinds of visual information may be displayed on the display 151. And, theses information may be displayed in characters, numerals, symbols, graphics, icons and the like. In order to input the information, at least one of the characters, numerals, symbols, graphics and icons are represented as a single predetermined array to be implemented in a keypad formation. And, this keypad formation may be so-called 'soft keys'.

FIG. 3A shows that a touch applied to a soft key is inputted through a front face of a terminal body. The display 151 is operable through an entire area or by being divided into a plurality of regions. In the latter case, a plurality of the regions may be configured interoperable. For instance, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

FIG. 3B shows that a touch applied to a soft key is inputted through a rear face of a terminal body. If FIG. 3A shows a case that the terminal body is vertically arranged (portrait), FIG. 3B shows a case that the terminal body is horizontally arranged (landscape). And, the display 151 may be configured to change an output picture according to the arranged direction of the terminal body.

FIG. 3B shows that a text input mode is activated in the terminal. An output window 151a' and an input window 151b' are displayed on the display 151. A plurality of soft keys 151c' representing at least one of characters, symbols and digits may be arranged in the input window 151b'. The soft keys 151c' may be arranged in the QWERTY key formation.

If the soft keys 151c' are touched through the touchpad (cf. '135' in FIG. 2B), the characters, symbols and digits corresponding to the touched soft keys are outputted to the output window 151a'. Thus, the touch input via the touchpad 135 is advantageous in that the soft keys 151c' may be prevented from being blocked by a finger in case of touch, which is compared to the touch input via the display 151. In case that the display 151 and the touchpad 135 are configured transparent, it is able to visually check fingers located at the backside of the terminal body. Hence, more correct touch inputs are possible.

Besides, the display 151 or the touchpad 135 may be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger may be visually displayed on the display 151. This may be useful in editing an image displayed on the display 151.

To cope with a case that both of the display (touchscreen) 151 and the touchpad 135 are touched together within a predetermined time range, one function of the terminal may be executed. The above case of the simultaneous touch may correspond to a case that the terminal body is held by a user using a thumb and a first finger (clamping). The above function may include activation or deactivation for the display 151 or the touchpad 135. The proximity sensor 141 described with reference to FIG. 1 is explained in detail with reference to FIG. 4 as follows.

Figure 4:
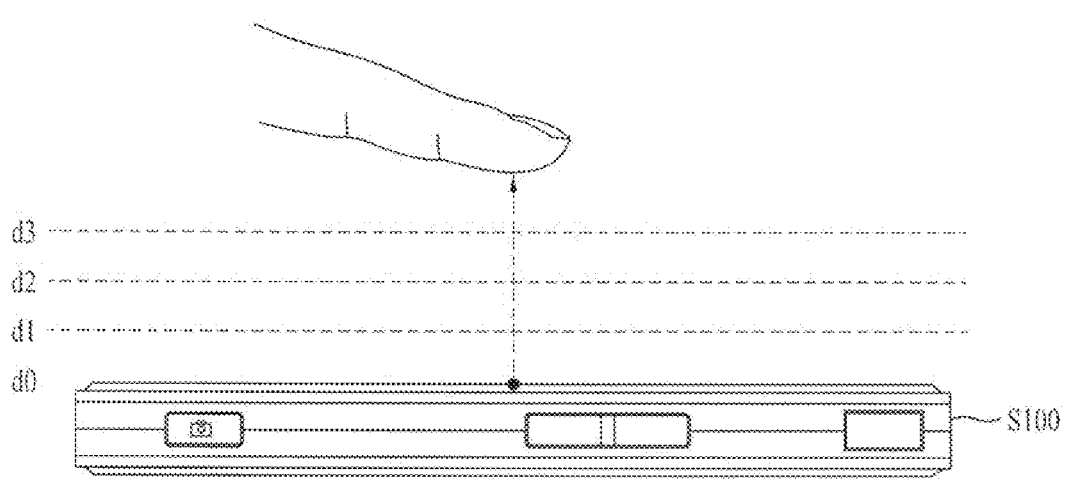
FIG. 4 is a diagram to explain the concept of proximity depth of a proximity sensor.

FIG. 4 is a conception diagram for explaining a proximity depth of a proximity sensor. Referring to FIG. 4, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 may be configured to output a different proximity signal according to a distance between the pointer and the proximity-touched touchscreen (hereinafter named 'proximity depth').

In FIG. 4, exemplarily shown is a cross-section of the touchscreen provided with a proximity sensor capable to three proximity depths for example. And, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. And, the controller 180 is able to perform various operation controls according to the various input signals.

Figure 5A:
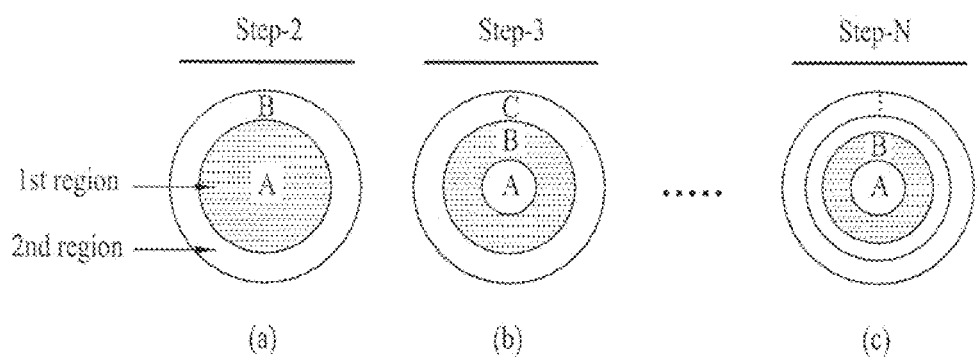
FIG. 5A and FIG. 5B are diagrams to explain the concepts of a proximity touch recognizing area for detecting a proximity signal and a haptic area for generating a tactile effect, respectively.
Figure 5B:
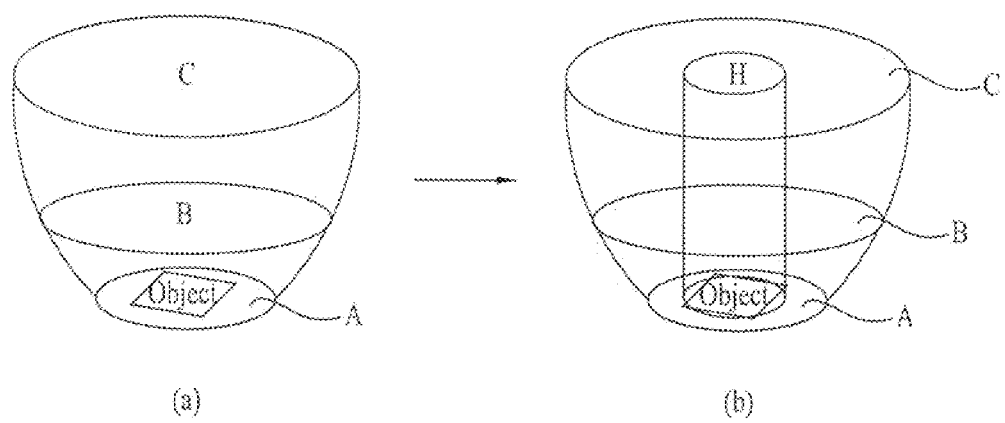

FIG. 5A and FIG. 5B are diagrams for the description of a proximity touch recognition area and a tactile effect generation region. FIG. 5A represents such an object as an icon, a menu item and the like in a circle type for clarity and convenience of explanation. A region for displaying an object on the display 151, as shown in (a) of FIG. 5A, may be divided into a first region A at a central part and a second region B enclosing the first region A. The first and second regions A and B may be configured to generate tactile effects differing from each other in strength or pattern. For instance, the first and second regions may be configured to generate 2-step vibrations in a manner of outputting a first vibration if the second region B is touched or outputting a second vibration greater than the first vibration if the first region A is touched.

In case that both of the proximity touch recognition region and the haptic region are simultaneously set in the region having the object displayed therein, it is able to set the haptic region for generating the tactile effect to be different from the proximity touch recognition region for detecting the proximity signal. In particular, it is able to set the haptic region to be narrower or wider than the proximity touch recognition region. For instance, in (a) of FIG. 5A, it is able to set the proximity touch recognition region to the area including both of the first and second regions A and B. And, it is able to set the haptic region to the first region A.

It is able to discriminate the region having the object displayed therein into three regions A, B and C as shown in (b) of FIG. 5A. Alternatively, it is able to discriminate the region having the object displayed therein into N regions (N>4) as shown in (c) of FIG. 5A. And, it is able to configure each of the divided regions to generate a tactile effect having a different strength or pattern. In case that a region having a single object represented therein is divided into at least three regions, it is able to set the haptic region and the proximity touch recognition region to differ from each other according to a use environment.

It is able to configure a size of the proximity touch recognition region of the display 151 to vary according to a proximity depth. In particular, referring to (a) of FIG. 5B, the proximity touch recognition region is configured to decrease by C→B→A according to the proximity depth for the display 151. On the contrary, the proximity touch recognition region is configured to increase by C→B→A according to the proximity depth for the display 151. Despite the above configuration, it is able to set the haptic region to have a predetermined size, as the region 'H' shown in (b) of FIG. 5B, regardless of the proximity depth for the display 151.

In case of dividing the object-displayed region for the setting of the haptic region or the proximity touch recognition region, it is able to use one of various schemes of horizontal/vertical division, radial division and combinations thereof as well as the concentric circle type division shown in FIG. 5A.

In the following description, the configuration of the above-described projector module provided to the bar type mobile terminal 100 is explained in detail with reference to FIG. 6A and FIG. 6B.

Figure 6A:
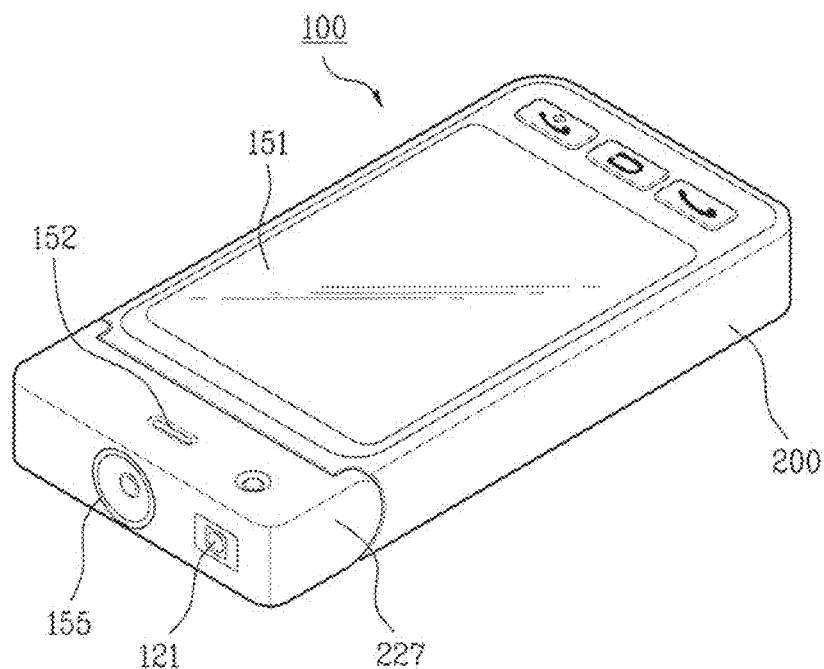
FIG. 6A and FIG. 6B are perspective diagrams of a mobile terminal according to one embodiment of the present invention.
Figure 6B:
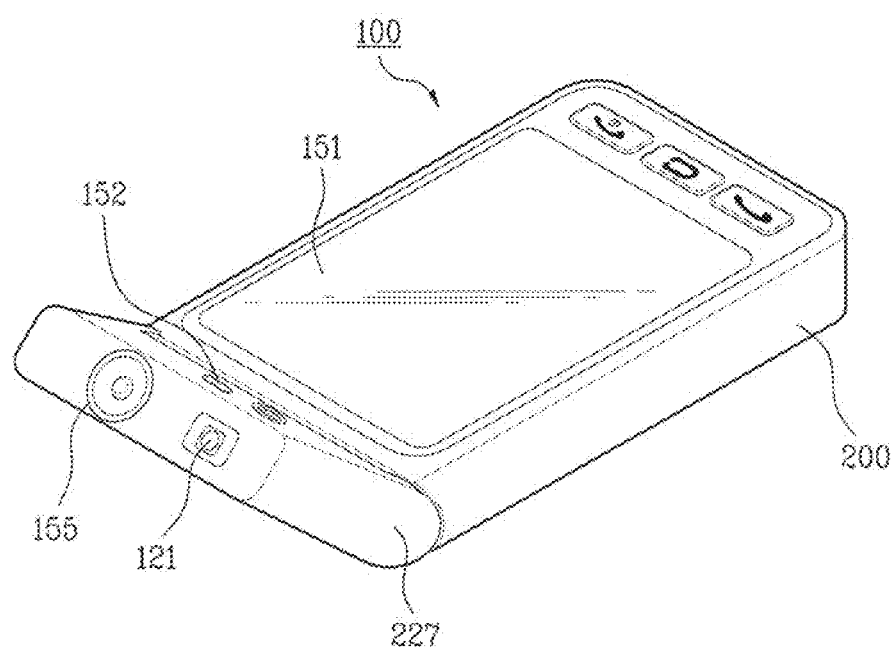
Figure 7:
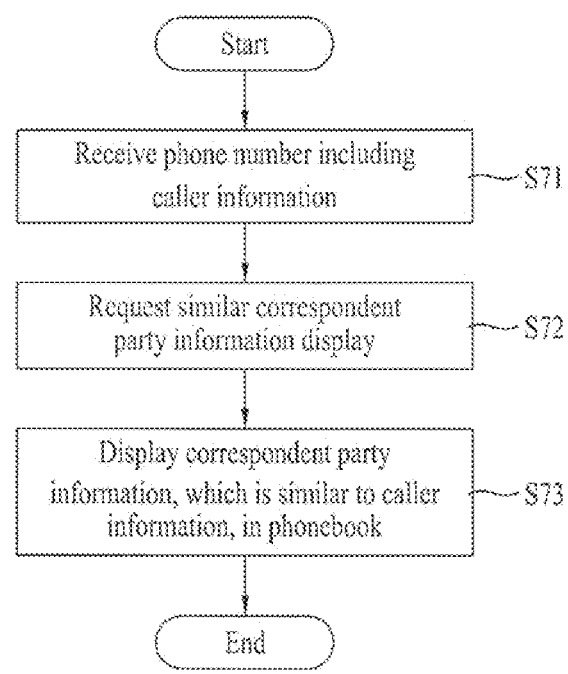
FIG. 7 is a flowchart for a method of controlling a mobile terminal according to an embodiment of the present invention.

FIG. 6A and FIG. 6B are perspective diagrams of a mobile terminal according to one embodiment of the present invention.

Referring to FIG. 6A, a projector body 105 having a projector module 155 may be rotatably coupled to a main body 101 of the mobile terminal.

In particular, the projector body 105 may be hinged to the main body 103. A projected angle of an image, which is projected using the projector module 155 provided to the projector body 105, may be controlled. And, a camera 121 may be provided to the projector body 105 to photograph the image projected by the projector module 155.

FIG. 6A shows a status before the projector body 105 rotatably coupled to the main body 103 is rotated, and FIG. 6B shows a status after the projector body 105 has been rotated.

In the following description, embodiments related to a controlling method applicable to the above-configured mobile terminal are explained with reference to the accompanying drawings. And, it is understood that the following embodiments are available individually or by being combined with one another.

In the following description of the embodiments, assume that the display 151 includes a touchscreen. If the display 151 includes the touchscreen, it is able to further implement the following embodiments. And, it is understood that the following embodiments may be sufficiently implemented by manipulations of the user input unit 140 without the touchscreen configuration of the display module 151.

In the following description, a display screen of the display 151 shall be indicated by a reference number 400.

Figure 8:
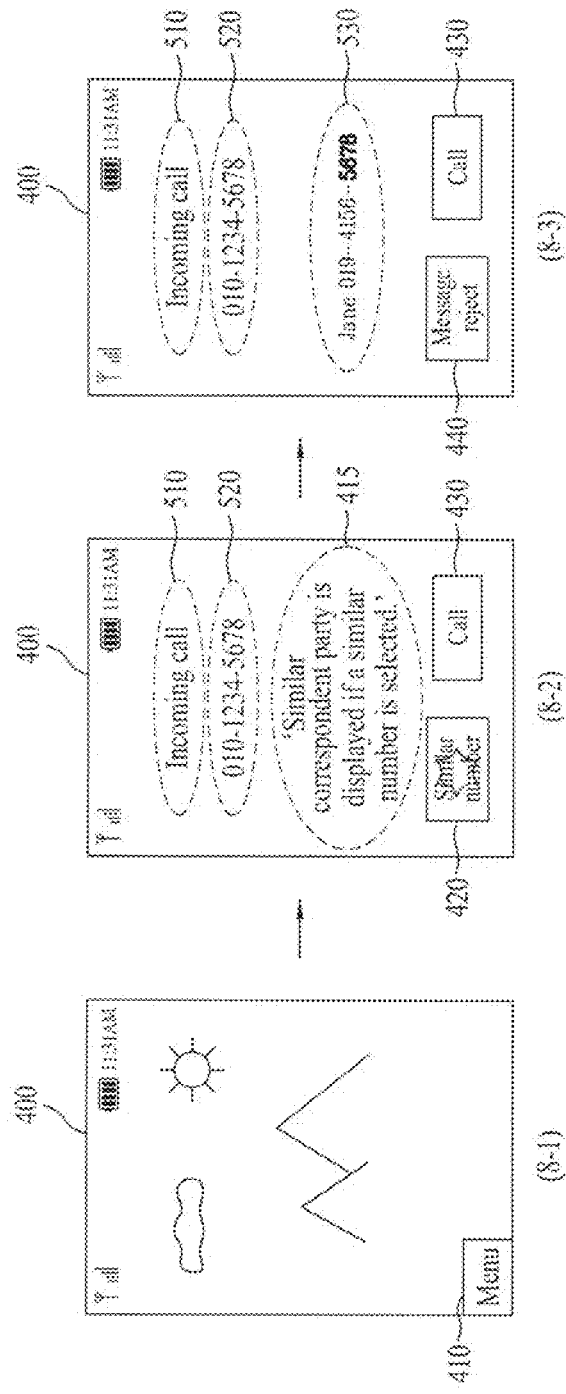
FIG. 8 shows diagrams of screen configurations of a display on which a method of controlling a mobile terminal according to an embodiment of the present invention is displayed.

Referring to (8-1) of FIG. 8, assume that the mobile terminal 100 is in a standby mode. And, it is exemplarily shown that a standby image according to the standby mode is displayed on the touchscreen 400 of the mobile terminal 100. In order to implement the present embodiment, the mobile terminal 100 does not need to be always in the standby mode. Hence, it is understood that another menu may be executed.

Referring to (8-2) of FIG. 8, the mobile terminal 100 receives a phone call for a phone call connection from a caller terminal via the wireless communication unit 110 [S71]. In particular, the phone call connection to the mobile terminal 100 is attempted by the caller terminal. Therefore, the controller 180 is able to display an incoming call notification text 510, which indicates that there is an incoming call for the phone call connection attempt from the caller terminal, on the touchscreen 400.

Meanwhile, the phone call may include prescribed caller identification information (hereinafter abbreviated 'caller information') such as a caller phone number of the caller terminal. In this case, the controller 180 checks whether there is a correspondent party having the same phone number of the caller phone number among a plurality of correspondent parties saved in a phonebook stored in the memory 160.

If there is the correspondent party having the same phone number of the caller phone number, the controller 180 displays information on the correspondent party (e.g., correspondent party's name, etc.) on the touchscreen 400 together with the caller phone number [not shown in the drawing]. Optionally, the correspondent party's information may be displayed on the touchscreen 400 without displaying the caller phone number. In this case, a similar number display icon may not be displayed on the touchscreen 400. The similar number display icon will be explained later.

Yet, if the correspondent party having the same phone number of the caller phone number does not exist, the controller 180 searches the correspondent parties saved in the phonebook for a correspondent party having a phone number (hereinafter named 'similar phone number') similar to the caller phone number.

If the correspondent party having the similar phone number exists, referring to (8-2) of FIG. 8, the controller 180 is display a similar number display icon 420, which enables a terminal user to select to view information on a correspondent party (hereinafter named 'similar correspondent party') having the similar phone number, on the touchscreen 400 together with the caller phone number 520. If the similar number display icon 420 is selected, the controller 180 is able to display an announcement text 415, which announces that the information on the similar correspondent party may be displayed on the touchscreen 400, together with the similar number display icon 420.

If a call connection to the phone call is requested by selecting the call icon 430 on the touchscreen 400 instead of selecting the similar number display icon 420, the controller 180 is able to directly connect the phone call with the caller terminal without displaying the similar correspondent party's information on the touchscreen 400 [not shown in the drawing].

Yet, if the similar number display icon 420 is selected [S72], referring to (8-3) of FIG. 8, the controller 180 displays the similar correspondent party's information 530 on the touchscreen 400 [S73]. If there are at least two similar correspondent parties, the controller 180 is able to display information on some or all of the at least two similar correspondent parties on the touchscreen 400. In this case, the similar correspondent party's information may include at least one of a similar correspondent party's name and a similar correspondent party's phone number.

When the similar correspondent party's phone number in the similar correspondent party information 530 is displayed, the controller 180 is able to control to visually display whether the caller phone number is determined as similar to the similar correspondent party phone number in a manner of checking which portion of the similar correspondent party's phone number is equal to the caller phone number.

When the similar correspondent party information 530 is displayed, the controller 180 is able to control the similar number display icon 420 to disappear. If the similar number display icon 420 disappears, the controller 180 is able to control another exemplary icon 440 to be displayed. This exemplary icon 400 may be displayed on the spot from which the similar number display icon 420 disappears. For example of the exemplary icon 440, there is an icon for sending the correspondent party terminal a rejection message indicating that the phone call is rejected.

Meanwhile, if the similar correspondent party does not exist, the controller 180 displays the caller phone number on the touchscreen 400 but may not display the similar number display icon 420. In this case, an announcement text indicating that the similar correspondent party does not exist may be displayed on the touchscreen 400 [not shown in the drawing].

In the above description, the similar number display icon 420 for displaying the similar correspondent party information 530 is displayed on the touchscreen 400. Yet, it is not mandatory for the similar number display icon 420 to be displayed on the touchscreen 400. For instance, even if the similar number display icon 420 is not displayed, the controller 180 is able to control the similar correspondent party information 530 to be displayed on the touchscreen 400 via a key button manipulation of the keypad of the user input unit 130.

The above description is made in a following manner. First of all, after the controller 180 has checked whether the similar correspondent party exists in the phonebook, if the similar correspondent party exists in the phonebook, the controller 180 displayed the similar number display icon 420. If the similar correspondent party does not exist in the phonebook, the controller 180 controls the similar number display icon 520 not to be displayed.

Yet, the present embodiment may be further implemented as follows. For instance, without considering whether the similar correspondent party exists in the phonebook, the controller 180 is able to control the similar number display icon 420 to be unconditionally displayed on the touchscreen 400. In this case, if the similar number display icon 420 is selected, the controller 180 checks whether the similar correspondent party exists in the phonebook. If the similar correspondent party does not exist in the phonebook, the controller 180 is able to control an announcement text, which announces that the similar correspondent party does not exist in the phonebook, to be displayed [not shown in the drawing]. Of course, as mentioned in the foregoing description, if the similar correspondent party exists in the phonebook, the controller 180 controls the similar correspondent party information to be displayed on the touchscreen 400.

And, it is apparent to those skilled in the art that the various methods of displaying the similar number display icon 420 and the similar correspondent party information according to the similar number display icon 420, which are described with reference to FIG. 8, is selectively applicable to a following-described method of displaying the similar number display icon and the corresponding similar correspondent party information.

In the following description, a reference for determining that the caller phone number is similar to the correspondent party phone number is explained with reference to FIG. 9.

Generally, the above phone number may be classified into two groups. For instance, a mobile communication phone number such as '010-1234-5678' may include three groups including a first group of '010', a second group of '1234' and a third group of '5678'.

Referring to (9-1) of FIG. 9, if the third group number of the caller phone number is equal to the third group number of the correspondent party phone number, it may be determined that the caller phone number is similar to the correspondent party phone number. Alternatively, if the third group number of the caller phone number is completely equal to the third group number of the correspondent party phone number, it may be determined that they are similar to each other. Alternatively, if they are equal to each other through prescribed digits or over (e.g., 3 digits or more), it may be determined that they are similar to each other.

Referring to (9-2) of FIG. 9, if the second group number of the caller phone number is equal to the second group number of the correspondent party phone number, it may be determined that the caller phone number is similar to the correspondent party phone number. Alternatively, if the second group number of the caller phone number is completely equal to the second group number of the correspondent party phone number, it may be determined that they are similar to each other. Alternatively, if they are equal to each other through prescribed digits or over (e.g., 3 digits or more), it may be determined that they are similar to each other.

Referring to (9-3) of FIG. 9, if the second group number of the caller phone number is equal to the third group number of the correspondent party phone number, it may be determined that the caller phone number is similar to the correspondent party phone number. Alternatively, if the second group number of the caller phone number is completely equal to the third group number of the correspondent party phone number, it may be determined that they are similar to each other. Alternatively, if they are equal to each other through prescribed digits or over (e.g., 3 digits or more), it may be determined that they are similar to each other.

Referring to (9-4) of FIG. 9, if the third group number of the caller phone number is equal to the second group number of the correspondent party phone number, it may be determined that the caller phone number is similar to the correspondent party phone number. Alternatively, if the third group number of the caller phone number is completely equal to the second group number of the correspondent party phone number, it may be determined that they are similar to each other. Alternatively, if they are equal to each other through prescribed digits or over (e.g., 3 digits or more), it may be determined that they are similar to each other.

In the above description, explained is that the similar correspondent party information is displayed while the caller terminal attempts a phone call connection to the mobile terminal 100. And, the similar correspondent party information is also displayable in other cases as well as in the course of the phone call connection attempt from the caller terminal. This is explained with reference to FIGS. 10 to 12 as follows.

Figure 10:
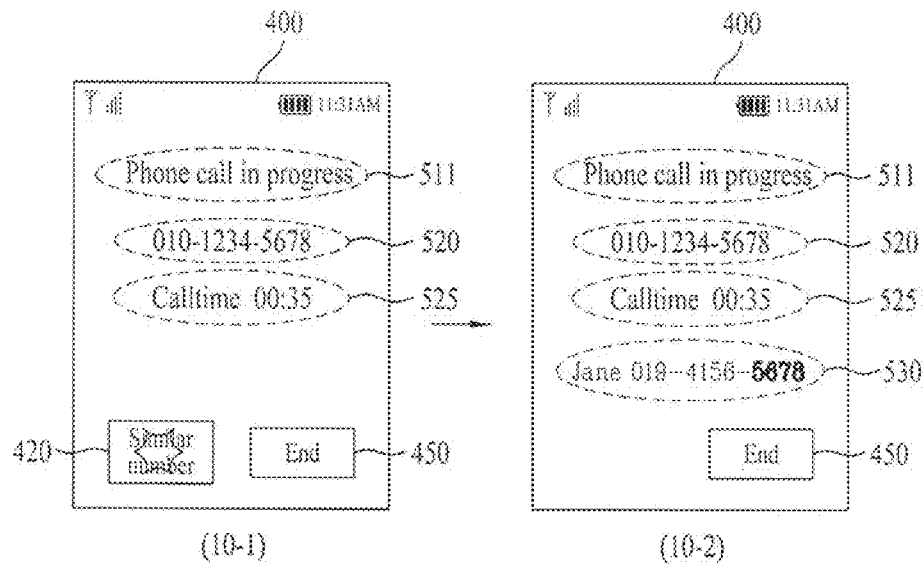
FIGS. 10 to 21 are diagrams of screen configurations of a display on which a method of controlling a mobile terminal according to an embodiment of the present invention is displayed.

Referring to FIG. 10, after the mobile terminal 100 has permitted the phone call connection attempt from the caller terminal, the similar correspondent party information may be displayed in the course of the corresponding phone call. In particular, referring to (10-1) of FIG. 10, after the phone call connection attempt of the caller terminal has been permitted, the controller 180 is able to display the similar number display icon 420 on the touchscreen 400 in the course of the phone call. The controller 180 is able to display a calltime 525 and a phone calling notification text 511 indicating that the mobile terminal 100 is in the course of the phone call with the caller terminal on the touchscreen 400 together with the similar number display icon 420.

If the similar number display icon 420 is selected by the terminal user, the controller 180 is able to display the similar correspondent party information 530, as shown in (10-2) of FIG. 10, on the touchscreen 400.

Figure 11:
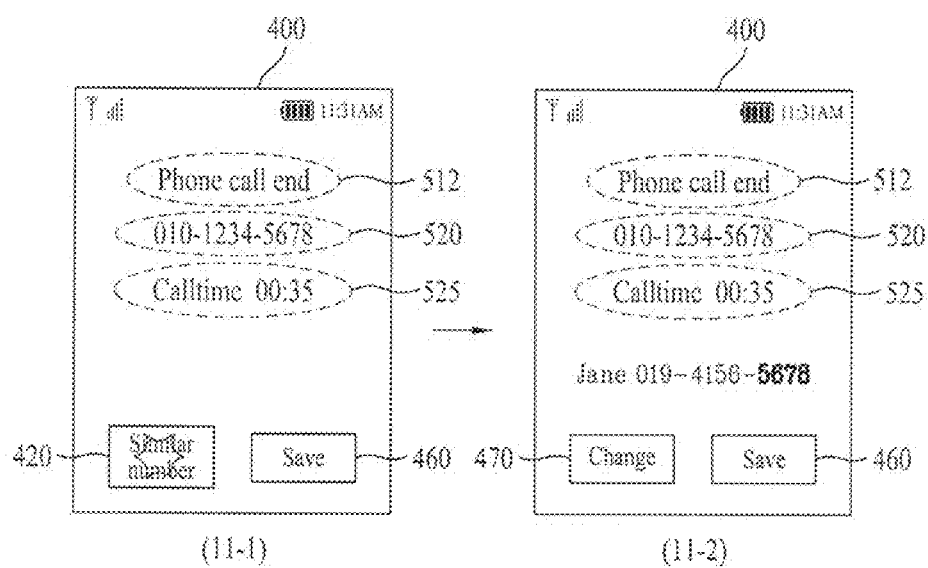

Referring to FIG. 11, after the mobile terminal 100 has disconnected the phone call from the caller terminal, the similar correspondent party information may be displayed. In particular, referring to (11-1) of FIG. 11, after the end of the phone call with the caller terminal, the controller 180 is able to display the similar number display icon 420 on the touchscreen 400. The controller 180 is able to display a calltime 525 and a phone call end text 512 indicating that the mobile terminal 100 has ended the phone call with the caller terminal on the touchscreen 400 together with the similar number display icon 420.

If the similar number display icon 420 is selected by the terminal user, the controller 180 is able to display the similar correspondent party information 530, as shown in (11-2) of FIG. 11, on the touchscreen 400.

If the similar correspondent party information 530 is displayed, the controller 180 is able to control the similar number display icon 420 to disappear. When the similar number display icon 420 disappears, the controller 180 is able to control another exemplary icon 470 to be displayed. In this case, the exemplary icon 470 may be displayed on the spot from which the similar number display icon 420 has disappeared. For example of the exemplary icon 470, there is a phone number change icon for changing the correspondent party phone number included in the correspondent party information as the caller phone number.

Figure 12:
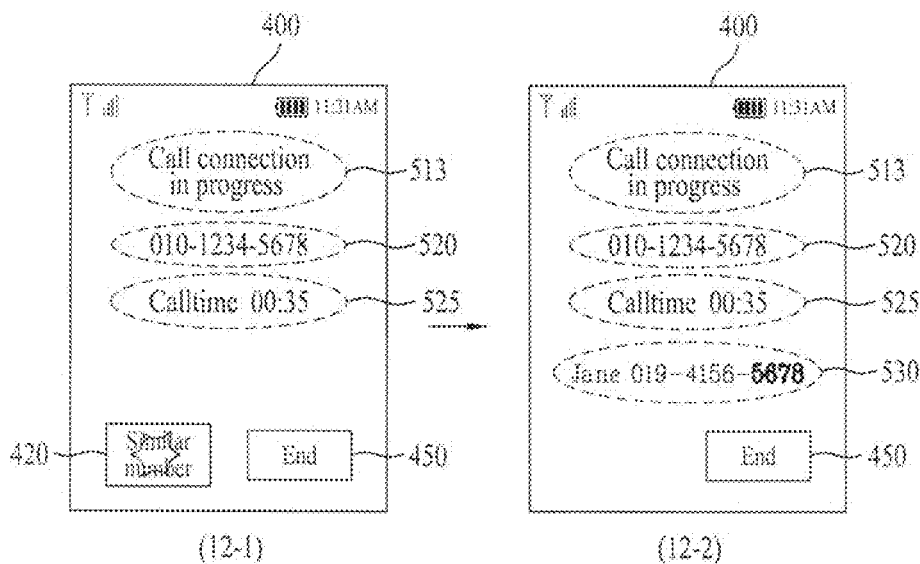

Meanwhile, while the mobile terminal 100 sends a phone call for a phone call connection with an external terminal, as shown in FIG. 12, instead of receiving a phone call for the phone call connection from the external terminal, the similar correspondent party information may be displayed. In particular, the controller 180 is able to display the similar number display icon 420 on the touchscreen 400, as shown in (12-1) of FIG. 12, while the mobile terminal 100 is sending a phone call to the external terminal. The controller 180 is able to display a calltime 525 and a phone call transmission notification text 513 indicating that the mobile terminal 100 is transmitting the phone call to the external terminal on the touchscreen 400 together with the similar number display icon 420.

If the similar number display icon 420 is selected by the terminal user, the controller 180 is able to display the similar correspondent party information 530, as shown in (12-2) of FIG. 12, on the touchscreen 400.

In case that at least two similar correspondent parties exist, it is not mandatory for information of the at least two similar correspondent parties to be simultaneously displayed. Instead, the information on some of the at least two similar correspondent parties is first displayed and the information on the rest of the at least two similar correspondent parties may be then displayed. This is explained in detail with reference to FIG. 13 as follows.

Figure 13:
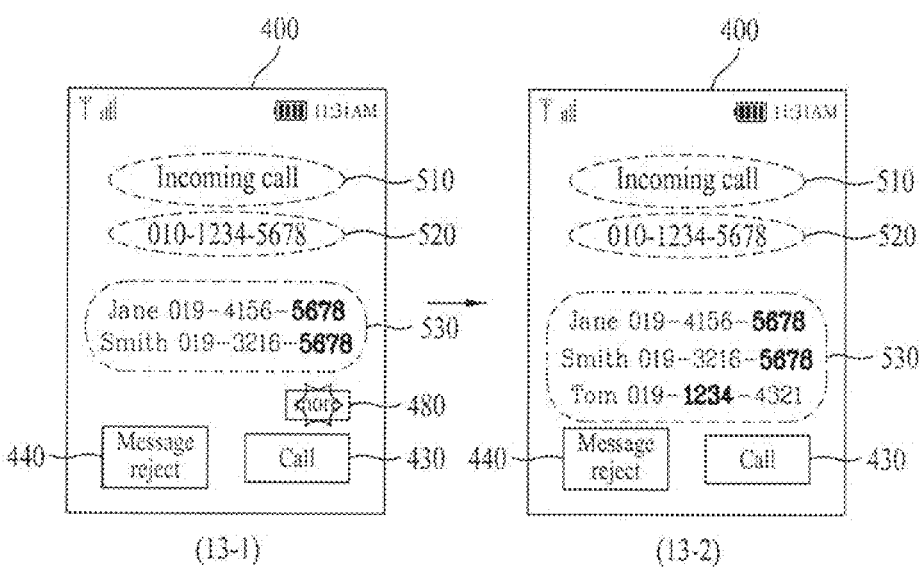

Referring to (13-1) of FIG. 13, if the number of the similar correspondent parties is equal to or greater than a prescribed number, the controller 180 controls information on specific similar correspondent parties among the whole similar correspondent parties to be displayed on the touchscreen 400. In this case, the specific similar correspondent parties may be preferentially selected from the similar correspondent parties having specific relations with the caller phone number. For example of the specific relation, the similar correspondent party phone number has the completely same number of the third group number of the caller phone number.

Subsequently, the controller 180 displays a more view icon 480 for enabling the terminal user to further display the information on the rest of the correspondent parties.

If the more view icon 480 is selected by the terminal user, referring to (13-2) of FIG. 13, the controller 180 is able to control the entire similar correspondent parties to be displayed. Optionally, if the more view icon 480 is selected, the controller 180 is able to configure the information on the rest of the correspondent parties to be displayed on the touchscreen 400 [not shown in the drawing].

In the following description, a process for changing the phone number of the similar correspondent party into the caller phone number is explained with reference to FIG. 14.

Figure 14:
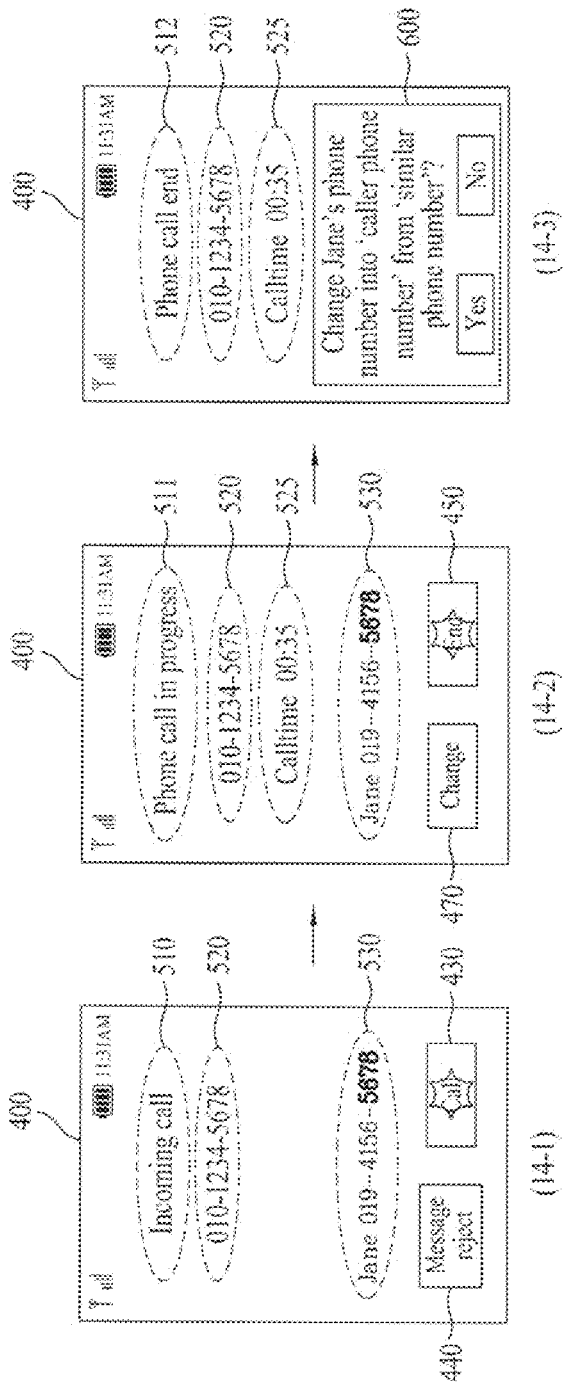

Referring to (14-1) of FIG. 14, the mobile terminal 100 is receiving a phone call for attempting a phone call connection from the caller terminal and similar correspondent party information 530 is being displayed on the touchscreen 400. In this case, a user terminal may permit the phone call connection. The permission of the phone call connection may be performed in a manner that a call icon 430 displayed on the touchscreen 400 is selected for example.

Even if the phone call connection is permitted, referring to (14-2) of FIG. 14, the controller 180 is able to keep displaying the similar correspondent party information 530. In this case, the similar correspondent party information may not be displayed [not shown in the drawing]. The controller 180 is able to display a phone number change icon 470 on the touchscreen 400. While the phone call is in progress, the phone number of the similar correspondent party may be changed into the caller phone number if the phone number change icon 470 is selected. This will be explained with reference to FIG. 15 later.

Meanwhile, the phone call is ended. This may be performed by selecting a phone call end icon 450 displayed on the touchscreen 400 for example.

If so, referring to (14-3) of FIG. 14, the controller 180 displays a phone number change window 660 for selecting to change the phone number of the similar correspondent party into the caller phone number on the touchscreen 400. If a terminal user requests a phone number change through the phone number change window 600, the controller 180 changes the phone number of the similar correspondent party into the caller phone number and then stores the changed number in the phonebook.

Meanwhile, as mentioned in the foregoing description, while the phone call is in progress, if the phone number change icon 470 shown in (14-2) of FIG. 14 is selected, the phone number correspondent party may be changed into the caller phone number.

Figure 15:
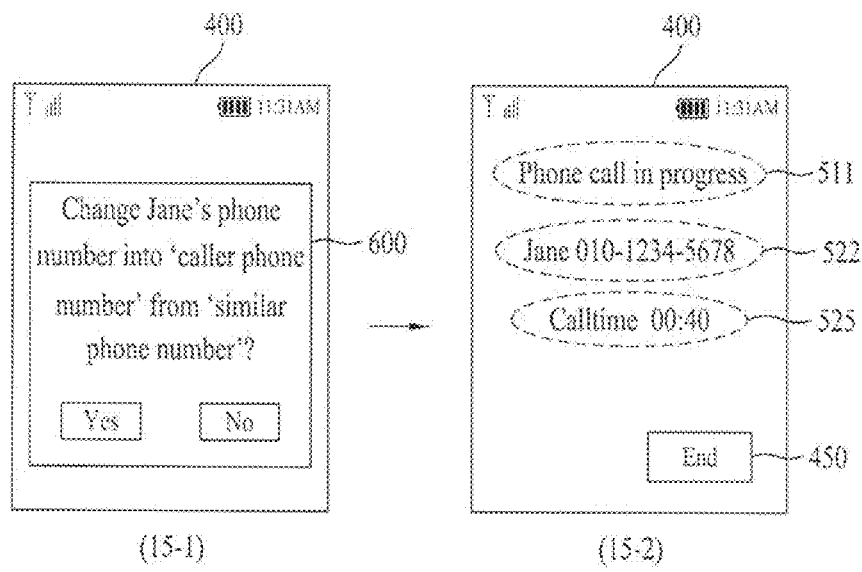

If the phone number change icon 470 is selected, referring to (15-1) of FIG. 15, the controller 180 displays a phone number change window 660 for selecting to change the phone number of the similar correspondent party into the caller phone number on the touchscreen 400. If a terminal user requests a phone number change through the phone number change window 600, the controller 180 changes the phone number of the similar correspondent party into the caller phone number and then stores the changed number in the phonebook.

Subsequently, referring to (15-2) of FIG. 15, the controller 180 displays the similar correspondent party information changed into the caller phone number as caller information 522.

In the following description, in case that at least two similar correspondent parties exist, a process for changing a phone number of one of the at least two similar correspondent parties into the caller phone number is explained with reference to FIG. 16.

Figure 16:
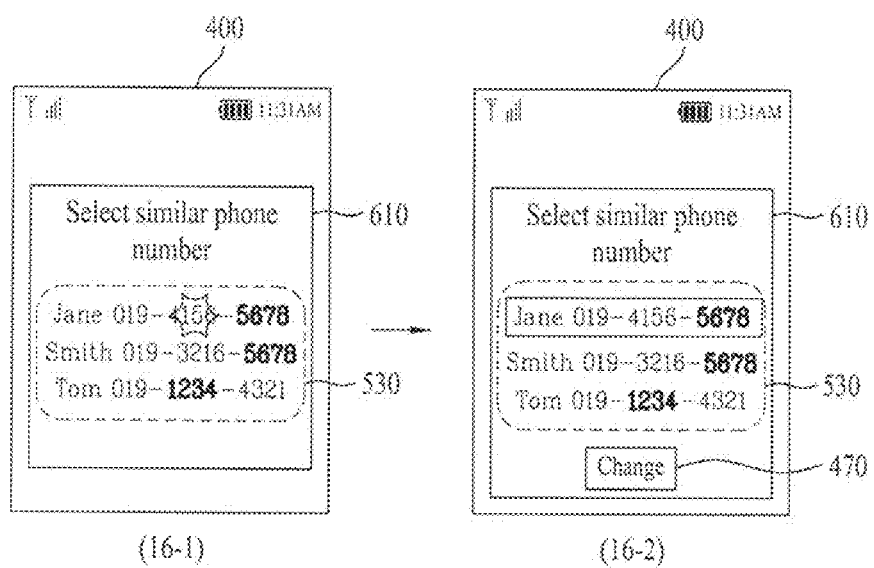

As mentioned in the foregoing descriptions with reference to FIG. 14 and FIG. 15, if the phone number change is requested by a terminal user, referring to (16-1) of FIG. 16, the controller 180 is able to display a similar correspondent party selecting window 610 for selecting one of the at least two similar correspondent parties. In this case, the similar correspondent party selecting window 610 may display the entire similar correspondent parties.

For instance, a prescribed one of the at least two similar correspondent parties may be selected if one of the displayed correspondent parties is touched.

If so, referring to (16-2) of FIG. 16, the controller 180 is able to control the selected similar correspondent party to be displayed by being visually discriminated. Subsequently, if the phone number change icon on the touchscreen 400 is selected, the phone number change is performed.

Optionally, if the prescribed similar correspondent party is selected in (16-1) of FIG. 16, it is able to configure the phone number change to be directly performed.

Meanwhile, the mobile terminal 100 may be configured to enable the phone number of the similar correspondent party to be changed if a phone call for a phone call connection is received from the caller terminal (i.e., before a phone call is made). This is explained in detail with reference to FIG. 17 as follows.

Figure 17:
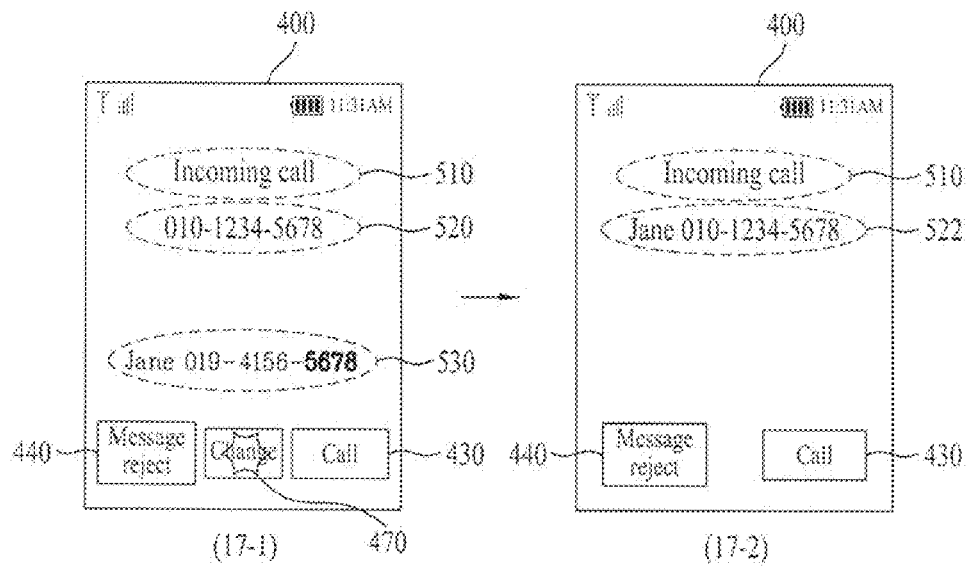

Referring to (17-1) of FIG. 17, in case of receiving a phone call from the caller terminal, the controller 180 is able to display a phone number change icon 470 together with the similar correspondent party information 530.

If the phone number change icon 470 is selected, referring to (17-2) of FIG. 17, the controller 180 is able to control a phone number of the similar correspondent party to be changed into the caller phone number before the phone call is made.

Subsequently, if a call icon 430 is selected by a terminal user, the phone call may be initiated [not shown in the drawing].

Figure 18:
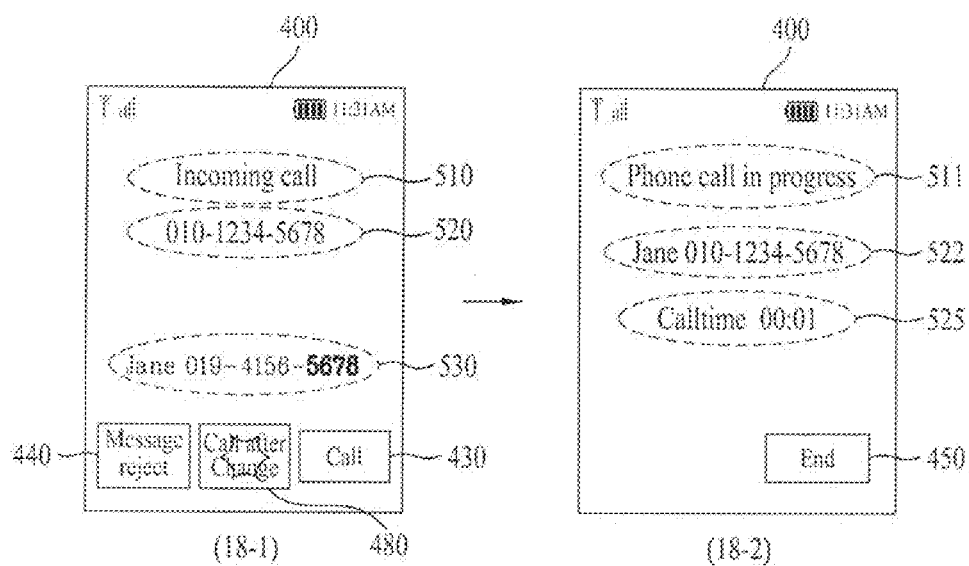

Referring to (18-1) of FIG. 18, in case of receiving a phone call from the caller terminal, the controller 180 is able to display a post-phone-number-change call icon 480 together with the similar correspondent party information 530.

If the post-phone-number-change call icon 480 is selected, referring to (18-2) of FIG. 18, the controller 180 is able to control a call with the caller terminal to be initiated right after the phone number of the similar correspondent party has been changed into the caller phone number.

In the above description, the similar correspondent party information is displayed through the selection of the similar number display icon 420 displayed on the touchscreen 400. Yet, the similar correspondent party information is not always displayed by the selection of the similar number display icon 420. This is explained in detail with reference to FIG. 19 and FIG. 20 as follows.

Figure 19:
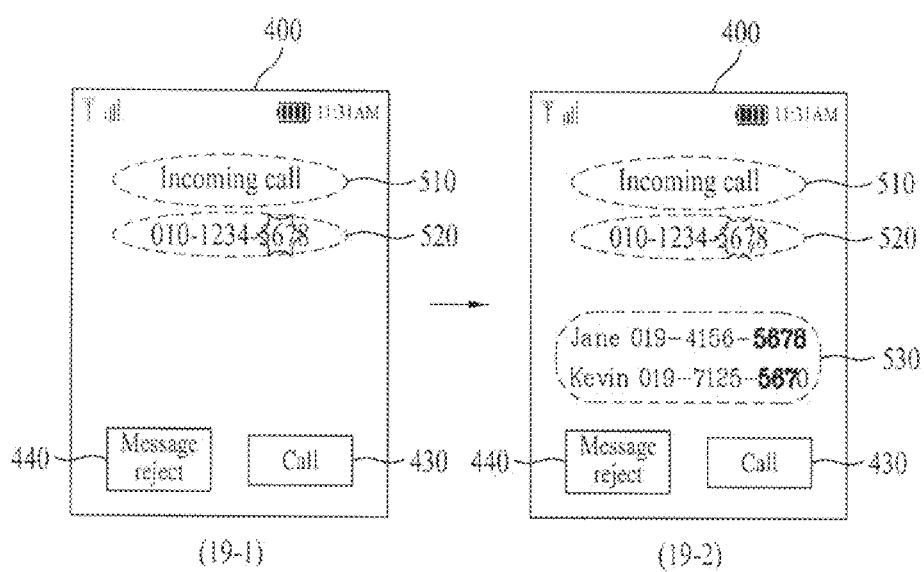

Referring to (19-1) of FIG. 19, the controller 180 is displaying the caller phone number 520 on the touchscreen 400. In this case, a proximity or contact touch is performed on the caller phone number 520.

If so, referring to (19-2) of FIG. 19, the controller 180 displays the similar correspondent party information 530 on the touchscreen 400. Subsequently, the proximity touch is released from the caller phone number 520 or another contact touch is performed on the caller phone number 520.

If so, referring to (19-1) of FIG. 19, the controller 180 is able to control the similar correspondent party information 530 to disappear from the touchscreen 400.

Meanwhile, it is able to configure the similar correspondent party information to be displayed according to a group number touched within the caller phone number.

In particular, referring to (19-1) of FIG. 19, a proximity or contact touch is performed on a third group number '5678' of the caller phone number 510.

If so, referring to (19-2) of FIG. 19, the controller 180 is able to control information on the similar correspondent party having the third group number equal to the caller phone number entirely or in part among the similar correspondent parties to be displayed.

Figure 20:
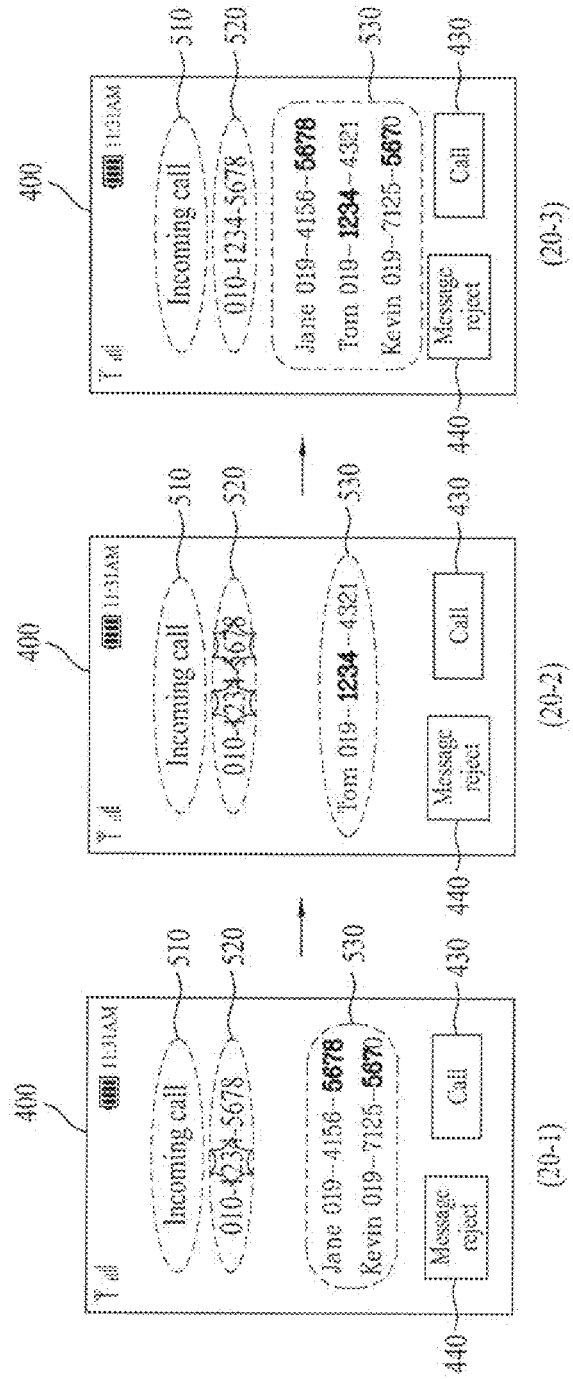

Referring to (20-1) of FIG. 20, a proximity or contact touch is performed on a second group number '1234' of the caller phone number 510.

If so, referring to (20-2) of FIG. 20, the controller 180 is able to control information on the similar correspondent party having the second group number equal to the caller phone number entirely or in part among the similar correspondent parties to be displayed.

Subsequently, referring to (20-2) of FIG. 20, a proximity or contact touch is simultaneously performed on the second and third group numbers '1234' and '5678' of the caller phone number 510 both.

If so, referring to (20-3) of FIG. 20, the controller 180 is able to control information on the similar correspondent party having the second or third group number equal to the caller phone number entirely or in part among the similar correspondent parties to be displayed.

Referring to (19-2) of FIG. 19, (20-1) of FIG. 20 and (20-3) of FIG. 20, the controller 180 is able to control the similar correspondent party information equal to the second or third group number entirely or in part to be preferentially displayed.

Figure 21:
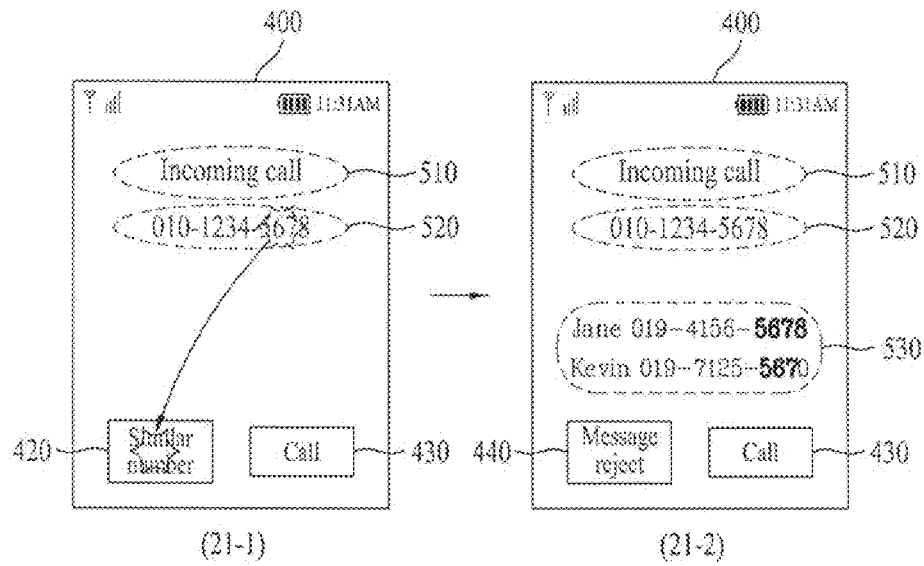

Referring to (21-1) of FIG. 21, the caller phone number 520 and the similar number display icon 420 are being displayed on the touchscreen 400. In this case, a third group number in the caller phone number 520 is touched and then dragged to the similar number display icon 420.

If so, referring to (21-1) of FIG. 21, the controller 180 is able to control the information of the similar correspondent party having the third group number equal to the caller phone number entirely or in part among the similar correspondent partied to be displayed.

In the above description, the similar correspondent party information is displayed in conjunction with the phone call. Yet, the embodiments of the present invention are non-limited to the phone call. This is explained with reference to FIGS. 22 to 25 as follows.

Figure 22:
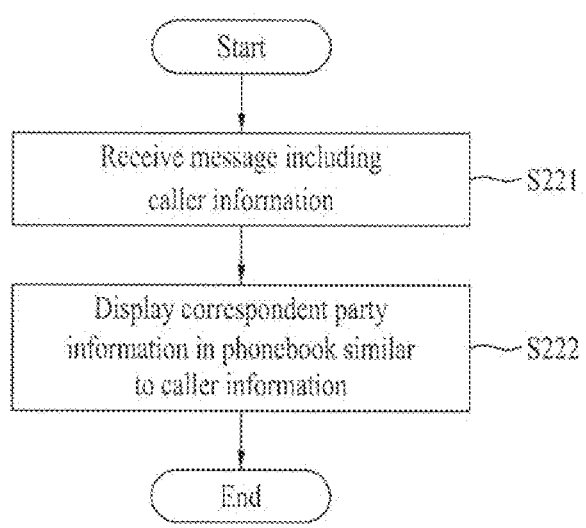
FIG. 22 is a flowchart for a method of controlling a mobile terminal according to an embodiment of the present invention.
Figure 23:
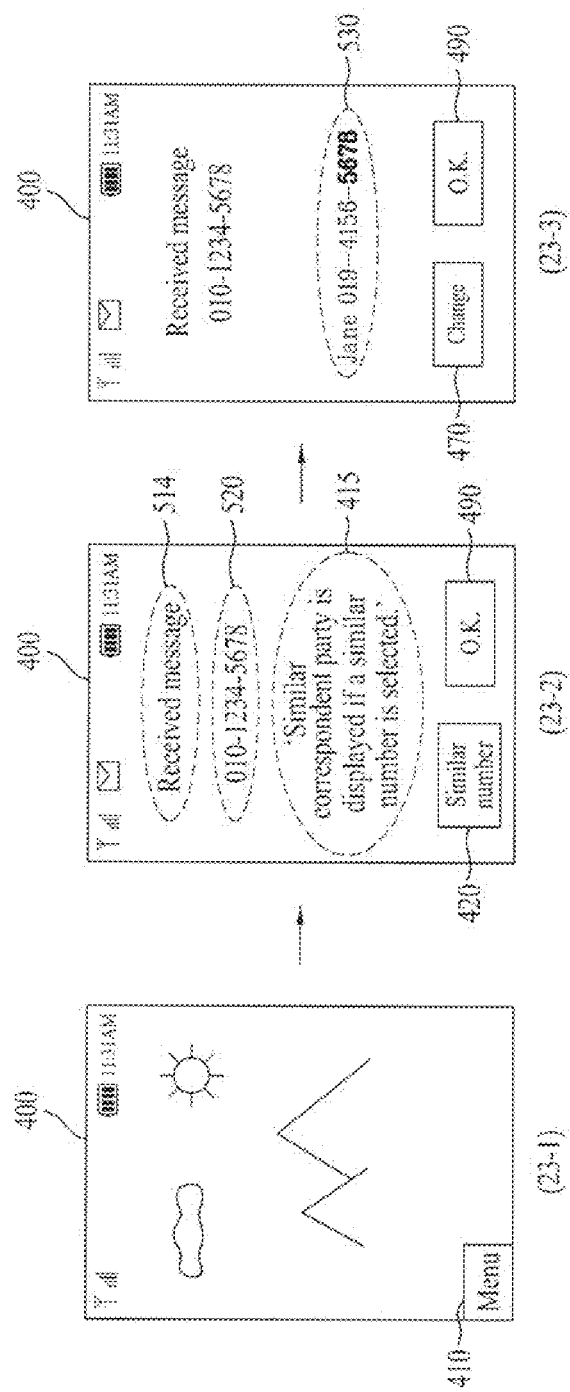
FIGS. 23 to 25 are diagrams of screen configurations of a display on which a method of controlling a mobile terminal according to an embodiment of the present invention is displayed.
Figure 24:
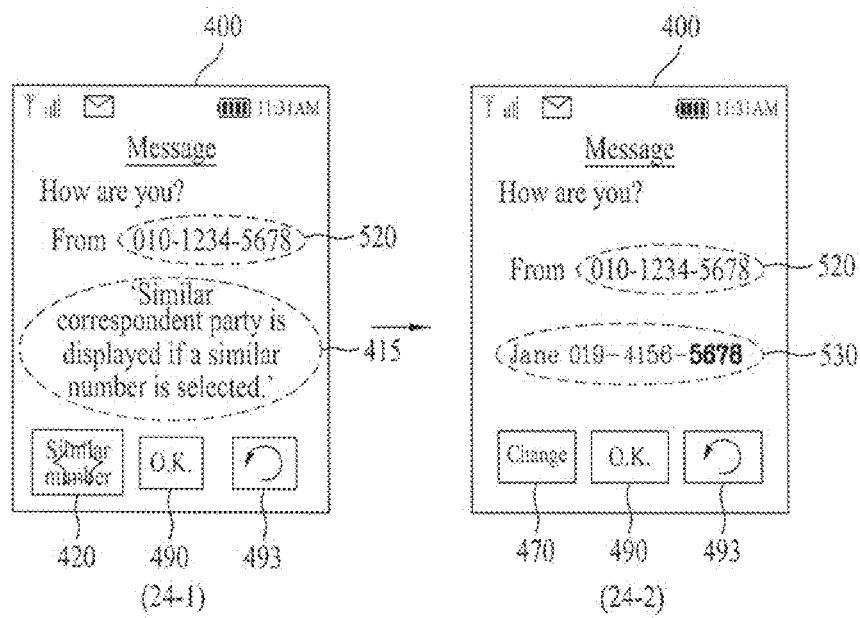
Figure 25:
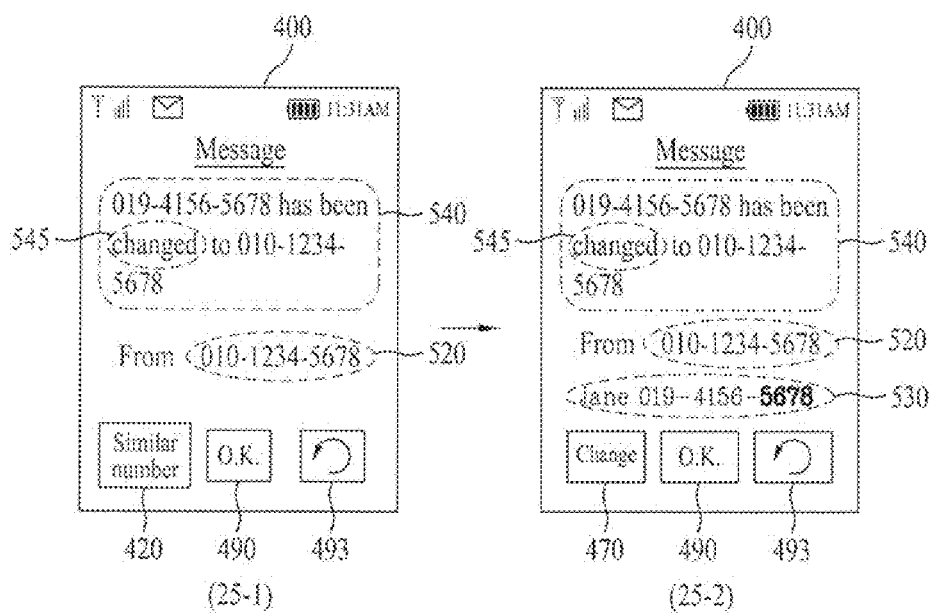

FIG. 22 is a flowchart for a method of controlling a mobile terminal according to an embodiment of the present invention, and FIGS. 23 to 25 are diagrams of screen configurations of a display on which a method of controlling a mobile terminal according to an embodiment of the present invention is displayed.

Referring to (23-1) of FIG. 23, assume that the mobile terminal 100 is in a standby mode. And, assume that a standby image according to the standby mode is displayed on the touchscreen 400 of the mobile terminal 100. In order to implement the present embodiment, the mobile terminal 100 does not need to be always in the standby mode. Hence, it is understood that another menu may be executed in the mobile terminal 100.

Referring to (23-2) of FIG. 23, the mobile terminal 100 receives a message including caller information from a caller terminal via the wireless communication unit 110 [S221]. In particular, the message may include one of a short text message, a multimedia message, an email message, etc. Therefore, the controller 180 is able to display a message reception notification text 514, which indicates that a message has been received from the caller terminal, on the touchscreen 400.

And, the controller 180 is able to control a caller phone number 520 included in the caller information to be displayed on the touchscreen 400.

In this case, the controller 180 checks whether there is a correspondent party having the same phone number of the caller phone number among a plurality of correspondent parties saved in a phonebook stored in the memory 160.

If there is the correspondent party having the same phone number of the caller phone number, the controller 180 displays information on the correspondent party (e.g., correspondent party's name, etc.) on the touchscreen 400 together with the caller phone number [not shown in the drawing]. Optionally, the correspondent party's information may be displayed on the touchscreen 400 without displaying the caller phone number. In this case, a similar number display icon may not be displayed on the touchscreen 400.

Yet, if the correspondent party having the same phone number of the caller phone number does not exist, the controller 180 searches the correspondent parties saved in the phonebook for a correspondent party having a phone number (i.e., a similar phone number) similar to the caller phone number.

If the correspondent party having the similar phone number exists, referring to (23-2) of FIG. 23, the controller 180 displays a similar number display icon 420 on the touchscreen 400 together with the caller phone number 520. If the similar number display icon 420 is selected, the controller 180 is able to display an announcement text 415, which announces that the information on the similar correspondent party may be displayed, on the touchscreen 400 together with the similar number display icon 420.

If a 'O.K.' icon 430 on the touchscreen 400 is selected for example instead of the similar number display icon 420, the controller 180 is able to display a text of the received message on the touchscreen 400 without displaying the similar party information on the touchscreen 400.

Yet, if the similar number display icon 420 is selected, referring to (23-3) of FIG. 23, the controller 180 displays the similar correspondent party's information 530 on the touchscreen 400 [S222]. If there are at least two similar correspondent parties, the controller 180 is able to display information on some or all of the at least two similar correspondent parties on the touchscreen 400. In this case, the similar correspondent party's information may include at least one of a similar correspondent party's name and a similar correspondent party's phone number.

When the similar correspondent party information 530 is displayed, the controller 180 is able to control the similar number display icon 420 to disappear. If the similar number display icon 420 disappears, the controller 180 is able to control another exemplary icon, e.g., a phone number change icon 470 to be displayed.

Through the phone number change icon 470, it is able to change the phone number included in the similar correspondent party information as the caller phone number.

Meanwhile, if the similar correspondent party does not exist, the controller 180 may not display the similar number display icon 420. In this case, an announcement text indicating that the similar correspondent party does not exist may be displayed on the touchscreen 400 [not shown in the drawing].

In the above description, after the message has been received, before the text of the message is displayed, the similar correspondent party information is displayed. This does not limit the present embodiment. So, the message is received, the message text is displayed on the touchscreen, and the similar correspondent party information may be then displayed. This is explained in detail with reference to FIG. 24 as follows.

Referring to (24-1) of FIG. 24, the text of the received message may be displayed on the touchscreen 400.

And, a caller phone number 520 included in the caller information of the received message may be displayed on the touchscreen 400 together with the text of the message.

The controller 180 checks whether a correspondent party having the similar phone number exists among the correspondent parties stored in the phonebook.

If the correspondent party having the similar phone number exists, referring to (24-1) of FIG. 24, the controller 180 is able to display the similar number display icon 420 on the touchscreen 400 together with the caller phone number 520.

If the similar number display icon 420 is selected, referring to (24-2) of FIG. 24, the controller 180 displays the similar correspondent party information 530 on the touchscreen 400.

When the similar correspondent party information 530 is displayed, the controller 180 is able to control the similar number display icon 420 to disappear. If the similar number display icon 420 disappears, the controller 180 is able to control another exemplary icon, e.g., a phone number change icon 470 to be displayed.

In the above description, after the similar number display icon 420 for enabling the mobile terminal 100 to display the similar correspondent party has been displayed, if the similar number display icon 420 is selected, the similar correspondent party is displayed. This description non-limits the present embodiment. For instance, when a text is displayed in case of or after the message reception, the mobile terminal 100 does not display the similar number display icon 420. Instead, the mobile terminal 100 directly searches whether the similar correspondent party exists and then displays the searched similar correspondent party without a separate command given by a terminal user. This is apparent to those skilled in the art in consideration of the above description and its details are omitted for clarity of this disclosure. Moreover, this is also applicable to the following embodiments in the same manner.

The following description is made with reference to FIG. 25.

Referring to (25-1) of FIG. 25, the mobile terminal 100 may receives an announcement message of a phone number change of the caller from the caller terminal. This phone number change announcement message may include a message collectively sent to a plurality of terminals including the mobile terminal 100 in order for the caller to announce the phone number change or a message sent to the mobile terminal 100 by the caller in response to a phone call made to the caller terminal by a user of the mobile terminal 100.

If the mobile terminal 100 receives the phone number change announcement message, as mentioned in the foregoing description, the mobile terminal 100 is able to display the similar number display icon. And, its details are omitted for clarity of this disclosure.

Referring to (25-2) of FIG. 25, the phone number change icon 470 may be displayed on the touchscreen 400. If the phone number change icon 470 is selected, a phone number included in the similar correspondent party information may be changed as the caller phone number.

It is not mandatory for the phone number change icon 470 to be displayed for the phone number change. For instance, referring to (25-2) of FIG. 25, it is able to configure the phone number change to be performed if a word corresponding to 'change' or the like in a text of the phone number change announcement message is touched.

The above-described display operation of the similar correspondent party may be performed when a communication list such as a call list and a message list is displayed in the mobile terminal 100 for example. The following description is further made with reference to FIG. 26 and FIG. 27 on the assumption that the communication list includes the message list.

Figure 26:
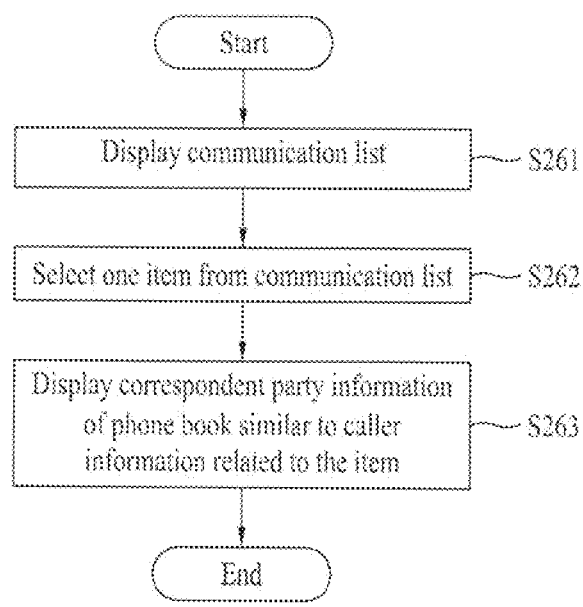
FIG. 26 is a flowchart for a method of controlling a mobile terminal according to an embodiment of the present invention.
Figure 27:
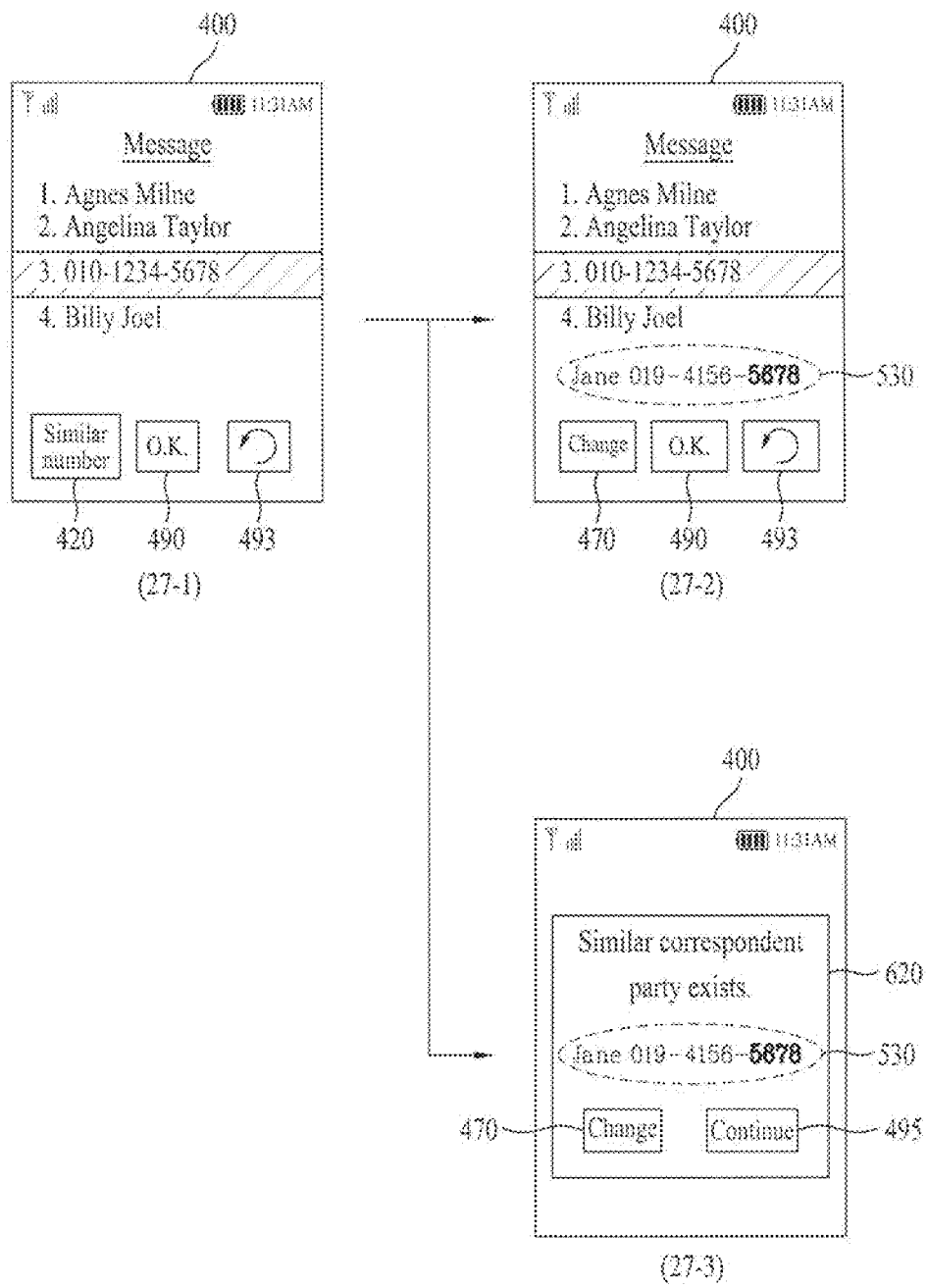
FIG. 27 is a diagram of screen configurations of a display on which a method of controlling a mobile terminal according to an embodiment of the present invention is displayed.

FIG. 26 is a flowchart for a method of controlling a mobile terminal according to an embodiment of the present invention, and FIG. 27 is a diagram of screen configurations of a display on which a method of controlling a mobile terminal according to an embodiment of the present invention is displayed.

Referring to (27-1) of FIG. 27, a received message list is displayed on the touchscreen 400 [S261]. And, a prescribed message is selected from the list [S262].

If so, the similar number display icon 420 may be displayed on the touchscreen 400.

If the similar number display icon 420 is selected, referring to (27-2) of FIG. 27, the similar correspondent party information related to the prescribed message and the phone number change icon 470 may be displayed on the touchscreen 400 [S263].

Even if the similar number display icon 420 is not selected in (27-1) of FIG. 27, the similar correspondent party information may be displayed. In particular, when a reply message is written using the prescribed message or a phone call is made to an originator of the prescribed message, referring to (27-3) of FIG. 27, a popup window 620 including the similar correspondent party information 530 and the phone number change icon 470 may be displayed. How to write a reply message using the prescribed message or how to make a phone call to an originator of the prescribed message is apparent to those skilled in the art and its details shall be omitted for clarity of this disclosure.

Figure 28:
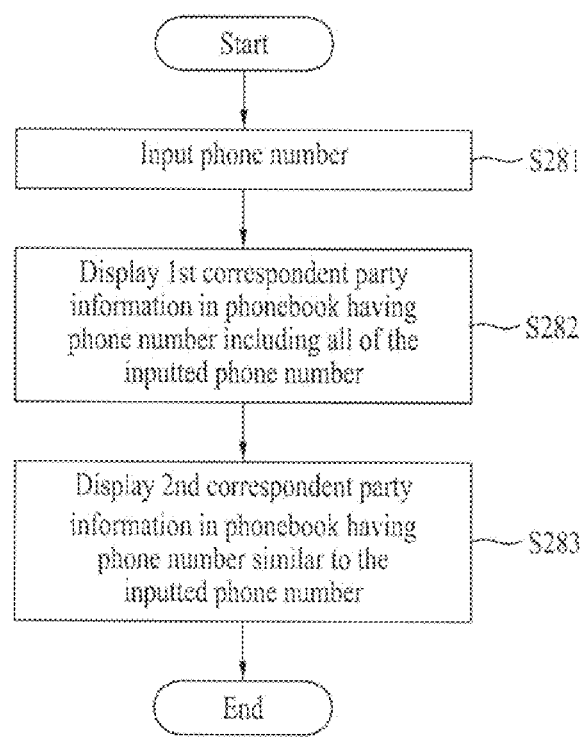
FIG. 28 is a flowchart for a method of controlling a mobile terminal according to an embodiment of the present invention.

In the above description, the process for displaying the similar correspondent party information in conjunction with the message transmission and reception is explained, by which embodiments of the present invention are non-limited. For instance, the similar correspondent party information may be displayed while a prescribed phone number is inputted to the mobile terminal 100. This is explained with reference to FIG. 28 and FIG. 29 as follows.

Figure 29:
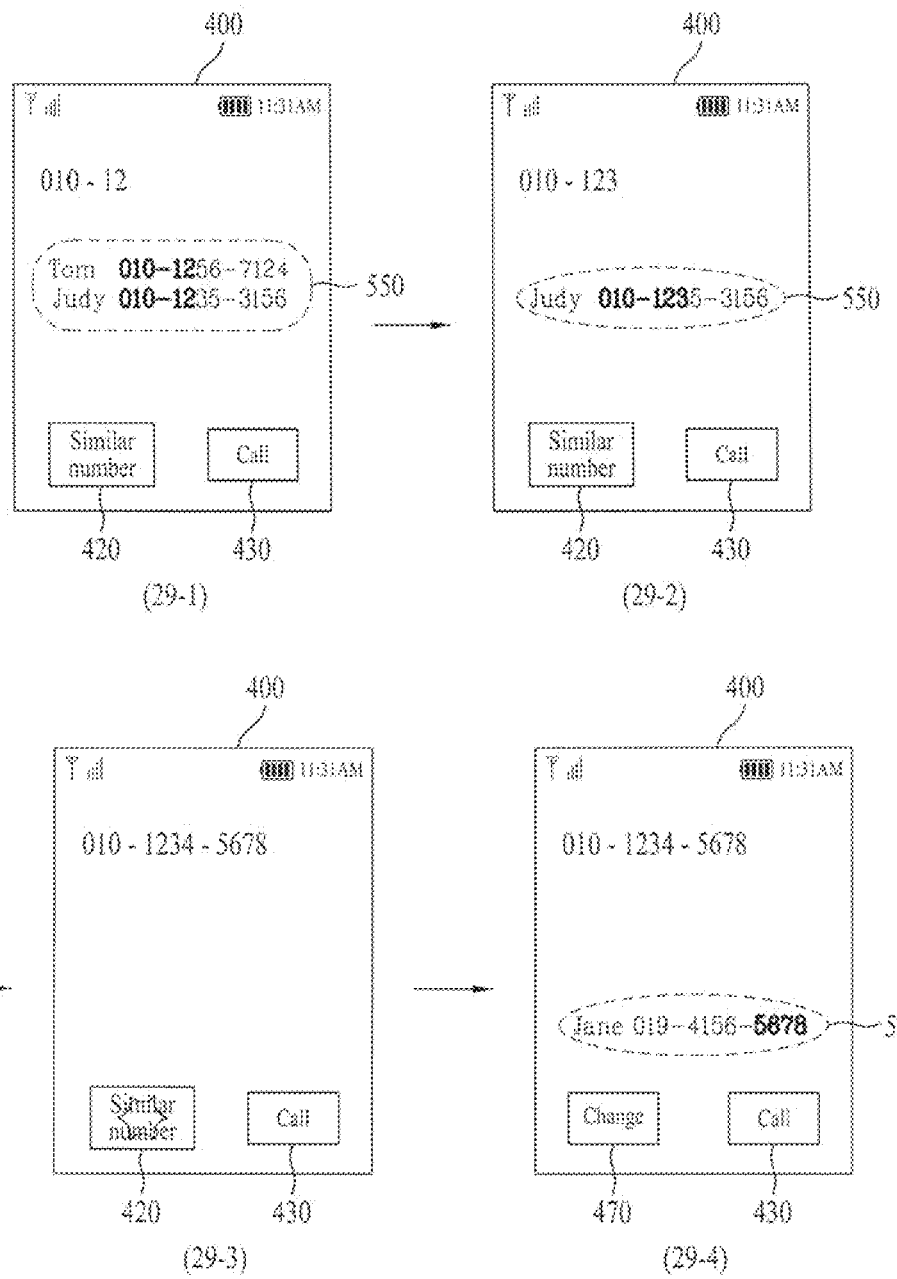
FIG. 29 is a diagram of screen configurations of a display on which a method of controlling a mobile terminal according to an embodiment of the present invention is displayed.

Referring to (29-1) of FIG. 29, a first portion '010-12' of a prescribed phone number '010-1234-5678' is inputted to the mobile terminal via the user input unit 230. The inputted number '010-12' may be displayed on the touchscreen 400.

Subsequently, the controller 180 searches the correspondent parties stored in the phonebook for information (hereinafter named 'matching correspondent party information) 550 on the correspondent party having a phone number including all of the inputted phone number '010-12' and then displays the matching correspondent party information 50 on the touchscreen 400. And, the similar number display icon 420 may be displayed on the touchscreen 400. If the similar number display icon 420 is selected, information of a similar correspondent party having a phone number similar to the inputted phone number '010-12' may be displayed on the touchscreen 400 [not shown in the drawing].

Subsequently, referring to (29-2) of FIG. 29, as the input of the prescribed phone number keeps being performed via the user input unit 130 of the mobile terminal 100, if a second portion '010-123' of the prescribed phone number '010-1234-5678' is inputted, the inputted phone number '010-123' may be displayed on the touchscreen 400.

If so, the controller 180 searches for the matching correspondent party information 550 on the inputted phone number '010-123' and then displays the found information on the touchscreen 400.

Subsequently, referring to (29-3) of FIG. 29, as the input of the prescribed phone number keeps being performed via the user input unit 130 of the mobile terminal 100, if all of the prescribed phone number '010-1234-5678' is inputted, the inputted phone number '010-1234-5678' may be displayed on the touchscreen 400.

In (29-3) of FIG. 29, exemplarily shown is that the matching correspondent party information 550 on the inputted phone number '010-1234-5678' does not exist.

Subsequently, the similar number display icon 420 is selected.

If so, referring to (29-4) of FIG. 29, the controller 180 searches for the similar correspondent party information 530 on the inputted phone number and is then able to display the found similar correspondent party information 530 on the touchscreen 400.

In the above description, it is not mandatory for the matching correspondent party information to be always displayed. Alternatively, it is able to configure the similar correspondent party information to be just displayed if the similar number display icon 420 is selected.

Accordingly, the present invention provides the following effects and/or advantages.

First of all, according to at least one of embodiments of the present invention, when a correspondent party terminal tries to make a phone call in a manner that a phone number changed similar to an original phone number of a correspondent party may become a call identification, the correspondent party terminal may display that there is an incoming call from the terminal user using the changed phone number.

Secondly, a phonebook of the correspondent party's terminal may be easily updated with the changed phone number for the terminal user's sake.

It will be apparent to those skilled in the art that various modifications and variations may be specified into other forms without departing from the spirit or scope of the inventions.

For instance, in the above description, as an icon is selected by a touch to a touchscreen, a prescribed command is inputted. Alternatively, according to an embodiment of the present invention, it is understood that a command corresponding to the icon may be inputted via an appropriate key manipulation of a user input unit or an audio input through a microphone.

Moreover, while a multimedia function (e.g., multimedia (video/audio) playback, broadcast playback, etc.) of the mobile terminal 100 is being executed, embodiments of the present invention may be implemented in a multi-tasking mode.

In addition, the above-described methods may be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer may include the controller 180 of the terminal.

It will be apparent to those skilled in the art that various modifications and variations may be made in the present invention without departing from the spirit or scope of the invention. Thus, it is intended that the present invention covers the modifications and variations of this invention provided they come within the scope of the appended claims and their equivalents.

What is claimed is:

1. A mobile communication terminal comprising:
a display configured to display information;
a user input unit configured to receive a user input;
a wireless communication unit configured to receive a call;
a memory configured to store phone book entries comprising contact information and
a control unit configured to:
control the display to display caller identification (ID) information associated with the received call;
determine an assigned portion of the caller ID information in response to a user selecting the assigned portion of caller ID information via the user input unit;
compare the assigned portion of the caller ID information with the contact information;
determine a matching phone book entry if the assigned portion of the caller ID information matches at least a portion of the contact information of the matching phone book entry;
control the display to display the contact information of the matching phone book entry.

2. The mobile terminal of claim 1, wherein the control unit is further configured to control the display to display a first icon and determine the assigned portion of caller ID information in response to a user dragging and dropping the assigned portion of caller ID information to the first icon via the user input unit.

3. The mobile terminal of claim 1, wherein the control unit is further configured to determine more than two assigned portions of caller ID information in response to a user simultaneously proximity or contact touching the portions of caller ID information via the user input unit.

4. The mobile terminal of claim 1, wherein:
the caller ID information comprises at least a number, an image, a video, or a message; and
the message comprises at least an e-mail message, an audio message, a SMS message, a MMS message, or an instant message.

5. The mobile terminal of claim 1, wherein determining of the matching phone book entry comprises detecting a match in at least an object of an image or a video, an audio feature of a video or an audio message, a portion of a phone number, or a portion of a text.

6. The mobile terminal of claim 1, wherein the control unit is further configured to control the display to conspicuously display the at least a portion of the contact information that matches the assigned portion of the caller ID information.

7. The mobile terminal of claim 2, wherein the control unit is further configured to control the display to terminate the display of the first icon after the display has displayed the contact information in response to the user dragging and dropping the assigned portion of the caller ID information to the first icon.

8. The mobile terminal of claim 7, wherein the control unit is further configured to:
control the display to display a second icon after terminating the display of the first icon, the second icon for at least rejecting a call, accepting a call, or editing the contact information.

9. The mobile terminal of claim 1, wherein the control unit is further configured to:
update the contact information of the matching phone book entry based on the caller ID information; and
control the display to display a menu for selecting a phone book entry to update when at least two matching phone book entries exist; and
update the selected phone book entry.

10. The mobile communication terminal of claim 1, wherein the control unit is further configured to update the contact information of the matching phone book entry based on the caller ID information.

11. The mobile communication terminal of claim 1, wherein the control unit is further configured to:
determine a plurality of matching phone book entries when each of the matching phone book entries include at least a portion of contact information that matches the assigned portion of the caller ID information;

cause the display to display first in order the contact information of the matching phone book entry or entries that have a specific relation with the caller ID information; and cause the display to display next the contact information of the matching phone book entry or entries that do not have a specific relation with the caller ID information.

12. The mobile communication terminal of claim 11, wherein the specific relation is that the at least a portion of contact information of the matching phone book entry is identical to the assigned portion of the caller ID information.

13. The mobile communication terminal of claim 11, wherein the control unit is further configured to:

cause the display to display a second icon; and cause the display to display the contact information of the matching phone book entry or entries that do not have a specific relation with the caller ID information in response to input received via the second icon.

14. The method of claim 1, wherein the control unit is further configured to:

update the contact information based on the caller ID information when the assigned portion of the caller ID information matches the at least a portion of the contact information.

15. The mobile terminal of claim 1, wherein the control unit is further configured to control the display to display a list including a plurality of contact information in case at least two matching phone book entries exist.

16. A method of updating contact information stored in a phone book entry of a mobile terminal, the method comprising:

receiving a call that includes caller identification (ID) information;

displaying, on a display, the caller ID information;

determining an assigned portion of the caller ID information in response to a user selecting the assigned portion of caller ID information via the user input unit;

comparing the assigned portion of the caller ID information with the contact information stored in the phone book entry;

determining a matching phone book entry if the assigned portion of the caller ID information matches at least a portion of the contact information of the phone book entry;

displaying, on the display, the contact information of the matching phone book entry.

17. The method of claim 16, further comprising:

determining the assigned portion of caller ID information in response to a user dragging and dropping the assigned portion of caller ID information to a first icon via the user input unit.

18. The method of claim 16, further comprising:

determining more than two assigned portions of caller ID information in response to a user simultaneously proximity or contact touching the assigned portions of caller ID information via the user input unit.

19. The method of claim 16, further comprising:

updating the contact information of the matching phone book entry based on the caller ID information.

20. The method of claim 16, further comprising:

determining a plurality of matching phone book entries when each of the matching phone book entries include at least a portion of contact information that matches the assigned portion of the caller ID information;

displaying first in order the contact information of the matching phone book entry or entries that have a specific relation with the caller ID information; and displaying next the contact information of the matching phone book entry or entries that do not have a specific relation with the caller ID information.

* * * * *